US012079759B1

(12) United States Patent
Humphrey et al.

(10) Patent No.: US 12,079,759 B1
(45) Date of Patent: Sep. 3, 2024

(54) SYSTEM AND METHODS FOR REMOTE AUDITIONS WITH PACE SETTING PERFORMANCES

(71) Applicant: JAMMIT, INC., Huntington Beach, CA (US)

(72) Inventors: Scott Humphrey, Huntington Beach, CA (US); Frank Gryner, St. Marys (CA); Brian S. Boyer, Lexington, MI (US)

(73) Assignee: JAMMIT, INC., Huntington Beach, CA (US)

( * ) Notice: Subject to any disclaimer, the term of this patent is extended or adjusted under 35 U.S.C. 154(b) by 0 days.

(21) Appl. No.: 18/170,417

(22) Filed: Feb. 16, 2023

(51) Int. Cl.
*H04N 5/222* (2006.01)
*G06Q 10/0639* (2023.01)
*G10H 1/36* (2006.01)

(52) U.S. Cl.
CPC ......... *G06Q 10/0639* (2013.01); *G10H 1/366* (2013.01); *H04N 5/222* (2013.01)

(58) Field of Classification Search
CPC ..... G06Q 10/0639; G10H 1/366; H04N 5/222
See application file for complete search history.

(56) References Cited

U.S. PATENT DOCUMENTS

| | | | | |
|---|---|---|---|---|
| 6,665,835 B1* | 12/2003 | Gutfreund | ............... | G06F 16/40 715/202 |
| 8,046,688 B2* | 10/2011 | Adams | ................... | G11B 27/34 715/835 |
| 9,183,887 B2* | 11/2015 | Barry | ..................... | G11B 27/34 |
| 10,726,822 B2* | 7/2020 | Caligor | .............. | G06Q 30/0247 |
| 2017/0294208 A1* | 10/2017 | Balabhadrapatruni | | ...................... G11B 27/10 |
| 2017/0337912 A1* | 11/2017 | Caligor | .............. | H04N 21/4341 |
| 2018/0350338 A1* | 12/2018 | Sung | ...................... | G11B 27/28 |

OTHER PUBLICATIONS

Backstage. 12 Film Terms on Set That Every Actor Needs To Know. https://www.backstage.com/magazine/article/12-film-set-terms-every-actor-needs-to-know-66213/, downloaded Aug. 8, 2023).

(Continued)

*Primary Examiner* — Ariel Mercado-Vargas
(74) *Attorney, Agent, or Firm* — Brian S. Boyer; SYNDICATED LAW, PC

(57) ABSTRACT

Systems and methods are provided for aligning and assembling an acting performance with a complementary event or series of events that can include one or more acting performances. An ensemble of performances can be assembled, and each performance in the ensemble can be created at a location remote from each of the other performances and uploaded for assembly into the ensemble. Actors can record their performance at any remote location, and upload their performance into one of the systems taught herein for assembly into any desired ensemble. Their performance can be assembled with any one or more other performances obtained from other actors. Actors can audition from any location in the world without requiring travel, and their performance can be screened on it's own merits, or screened as a part of any one or more compilations of performances in the search for a desired ensemble of actors.

20 Claims, 18 Drawing Sheets

(56) References Cited

OTHER PUBLICATIONS

Casting Frontier. (available from https://castingfrontier.com/what-is-timing-for-an-actor-bring-it-episode-18/, downloaded Aug. 8, 2023).
Dragon Professional (available from Nuance, https://www.nuance.com/dragon/business-solutions/dragon-professional-individual.html, downloaded Aug. 8, 2023).
Film Term Glossary. (available from Brooklyn College Film Department, http://userhome.brooklyn.cuny.edu/anthro/jbeatty/COURSES/glossary.htm, downloaded Nov. 4, 2020).
Google Cloud Speech API. Speech-to-text. (available from Google, https://cloud.google.com/speech-to-text, downloaded Aug. 10, 2023).
Microsoft Azure AI Speech (available from Microsoft, https://azure.microsoft.com/en-us/products/cognitive-services/speech-services/, downloaded Aug. 10, 2023).
Murf. AI Voice Generator: Versatile Text to Speech Software. (available from Murf, https://murf.ai/, downloaded Aug. 10, 2023).
Philips Speechlive (available from Philips, https://www.speechlive.com/us/, downloaded Aug. 10, 2023).
Speechelo (available from Nooveau Media Ltd, https://speechelo.com/, downloaded Aug. 10, 2023).
Speechify (available from Speechify, https://speechify.com/, downloaded Aug. 10, 2023).

* cited by examiner

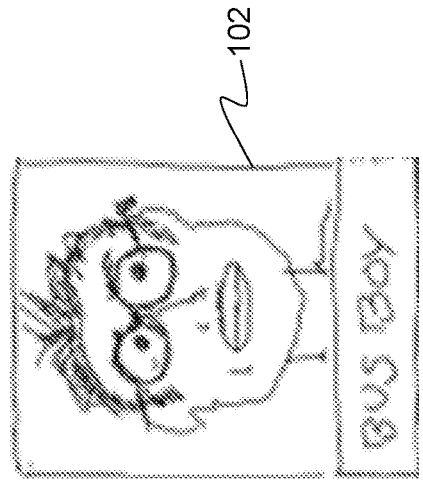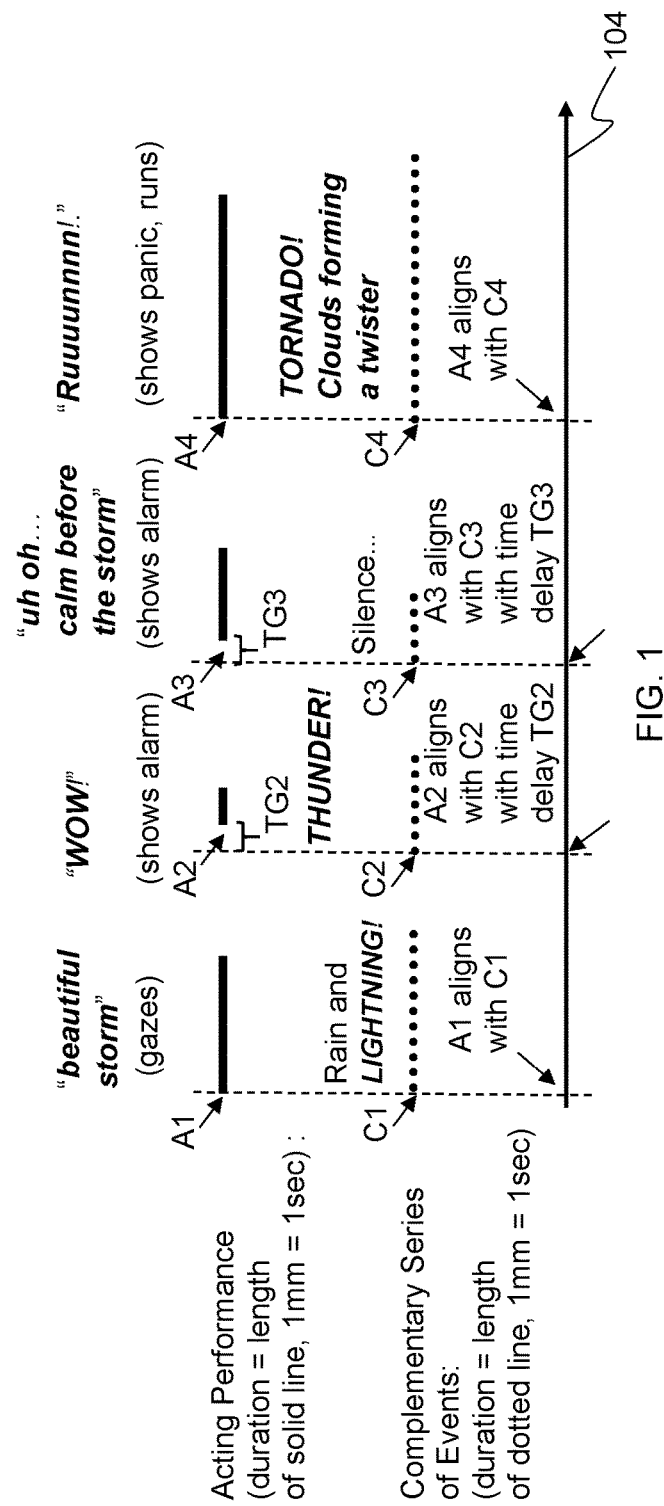
FIG. 1

| ACT | | | | | | | | |
|---|---|---|---|---|---|---|---|---|
| Scene Sequence 1<br>14 minutes<br>Location: Astroidia | | | Scene Sequence 2<br>6 minutes<br>Location: Titanic | | | Scene Sequence 3<br>10 minutes<br>Locations:<br>Astroidia and Titanic | | |
| Beat 1<br>4 min | Beat 2<br>2 min | Beat 3<br>8 min | Beat 1<br>2 min | Beat 2<br>1.5 min | Beat 3<br>2.5 min | Beat 1<br>2 min | Beat 2<br>6 min | Beat 3<br>2 min |
| Astroidia<br>Lab | Astroidia<br>Lab | Astroidia<br>Lab | Titanic<br>Turbolift | Titanic<br>Turbolift | Titanic<br>Johnson<br>Quarters | Astroidia<br>Lab | Titanic<br>Bridge | Titanic<br>Bridge |
| *Jenny* | *Charles* | *Jenny* | *Lentil* | *Johnson* | *Johnson* | *Michael* | *Stan* | *Johnson* |
| Michael | Jenny | Charles | Johnson | Caretaker | Jenny | Jenny | Johnson | Stan |
|  | Michael | Michael | Caretaker | Nancy | Nancy |  |  | Lentil |
|  |  |  |  |  |  |  |  |  |
| BGA1 | BGA1 | BGA1 |  |  |  | BGA1 | BGA4 | BGA4 |
| BGA2 | BGA2 | BGA2 |  |  |  | BGA2 | BGA5 | BGA5 |
| BGA3 | BGA3 | BGA3 |  |  |  | BGA3 | BGA6 | BGA6 |
|  |  |  |  |  |  |  | BGA7 | BGA7 |

Timing Segment Borders (Actor in bold is pace-setter)

BGA1: background actor 1 in Astroidia Lab, few lines, character development of Jenny and Michael
BGA2: background actor 2 in Astroidia Lab, few lines with BGA1
BGA3: background actor 3 in Astroidia Lab, no lines, visual effect for Lab only
BGA4: background actor 4 on Titanic Bridge, few lines, character development of Stan and Johnson
BGA5: background actor 5 on Titanic Bridge, few lines with BGA4, visual effect for Bridge
BGA6: background actor 6 on Titanic Bridge, no lines, visual effect for Bridge only
BGA7: background actor 7 on Titanic Bridge, no lines, visual effect for Bridge only

FIG. 6

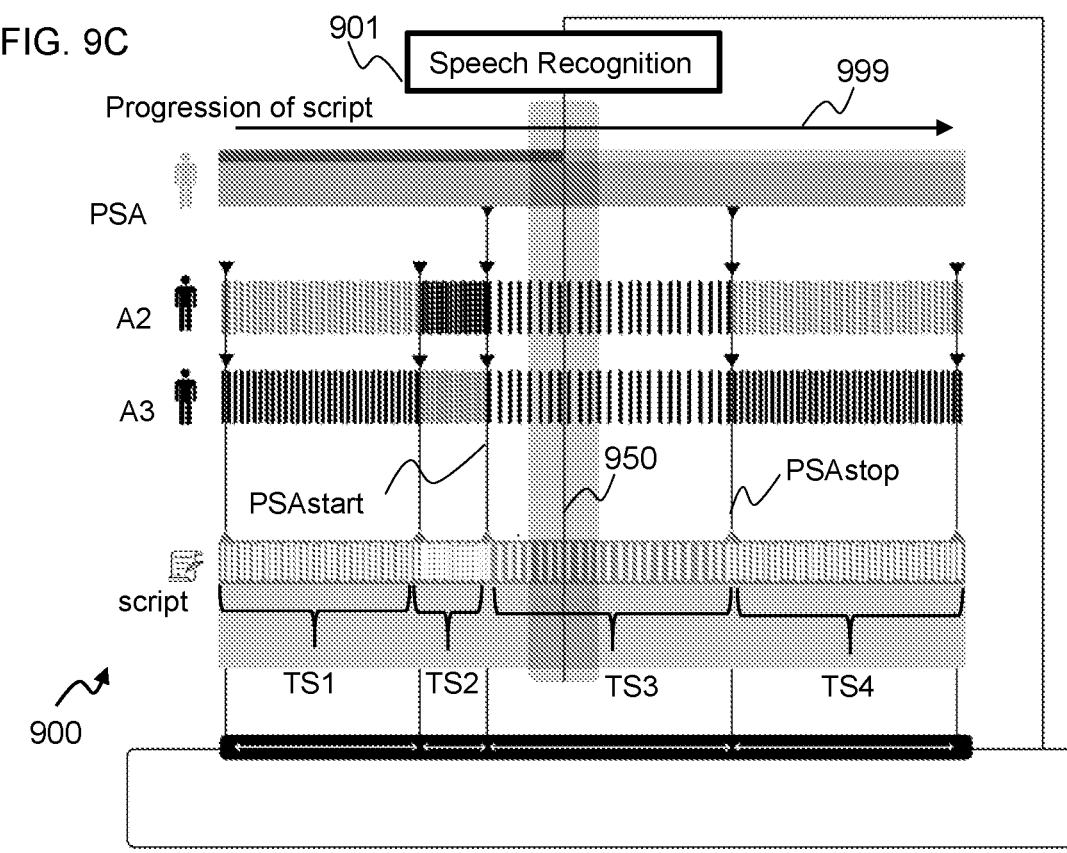
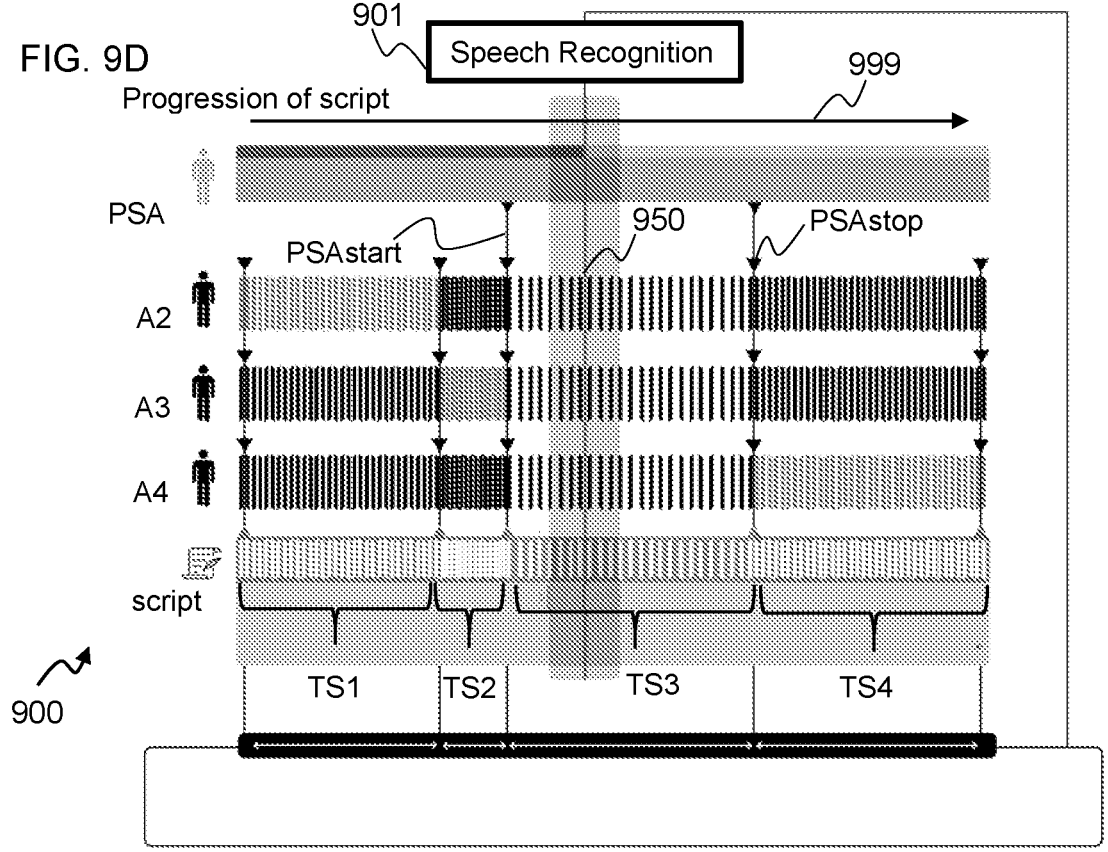

LEGEND:
— volume performed, $V_P$
— volume targeted, $V_T$
| timing of volume performed, $T_{VP}$
| timing of volume targeted, $T_{VT}$

SYSTEM AND METHODS FOR REMOTE AUDITIONS WITH PACE SETTING PERFORMANCES

CROSS-REFERENCE TO RELATED APPLICATIONS

This application does not claim the benefit of an earlier filing date of any application under either 35 U.S.C. 119 or 35 U.S.C. 120.

BACKGROUND

Field of the Invention

The systems and methods taught herein are generally directed to assembling, displaying, and evaluating an ensemble of acting performances that include a plurality of submissions from remote locations uploaded through a network to a director for the assembly.

Description of the Related Art

Most everyone enjoys watching a talented actor or ensemble of actors create a desired effect or artistic expression. Unfortunately, talent is not enough to get past a gauntlet of challenges presented by the traditional practices of the acting industry.

Traditional auditioning and casting practices assume significant costs of travel in bringing actors to an audition location, including the costs of travel time, such as lodging and food for the duration of the time spent traveling. It's not uncommon for the audition to be held far away from the actor's home, requiring travel to a different city, a different state, or perhaps even a different country. It's not uncommon for actors to pay their own way, and for auditions to be offered at the last minute, increasing the costs of plane fare dramatically, and making it difficult-to-impossible for a cash-strapped actor to make it to the audition. Regardless of who pays, these are significant costs, and the significant costs have the effect of limiting the number of auditions that are possible. This traditional practice is also slower, which also has the effect of limiting the number of auditions that are possible.

Traditional practices also require lots of organization. Due to the limited number of auditions possible, talent needs to be located, auditions arranged, auditions held, and communications and information provided to all relevant people in the casting process. Traditionally, this is a challenging procedure. Lots of data is moved around to all of the relevant people, each of which also can be in a different city, a different state, or perhaps a different country. As such, these relevant people in the process often have to travel too, increasing the costs and delaying the process. The use of physical locations and the physical transport of people and information from location to location around the world has become an archaic, slow, and costly process that limits the talent available for review, making it harder to find the best talent.

The technologies presented herein provide new opportunities to change the paradigm of auditioning and casting through the growing, worldwide acceptance of meeting virtually through the internet. The technologies presented herein provide a virtual network for the acting industry and arrange an otherwise random and chaotic sequence of events into a coordinated ensemble of performances. Actors are provided with audition opportunities, rehearsal and assessment tools, recording tools, audio/video enhancement tools, and audio/video and social networking tools, for example. Those holding auditions and casting are provided with tools to review an uploaded performance, tools to assemble an uploaded performance with other uploaded performances to create a variety of ensembles of performances, and tools to review and assess individual performances and ensembles of performances. Reviewers can locate more talent from a worldwide pool, decrease the cost of viewing the talent, increase the number of possible auditions dramatically, and create a much broader and deeper range of talent for the coming generations. And, the opportunities for actors to expose their talents and see some success can be increased dramatically.

This technology does not address a small task, as these performances are complex and hard to assemble with other performances, the performances including "instincts" that guide the actor on when to start, stop, and interact with other actors, as well as when to speed-up, slow-down, get quieter, get louder, become silent, make gestures, and the like. There are a large number of variables between actors, and so the alignment of the actors would be impossible without the technologies provided herein. A musical ensemble, in contrast, can be readily assembled from a set of performances, each of which are recorded using the same constant metronome tempo. The constant tempo is the template for the alignment and assembly. However, unlike the musical performance, the tempo, rhythm, or pace of an acting performance is not "set", and is not constant. For this reason, actors tend to follow queues from each other in real-time to maintain an alignment in a group performance. Independently, in that sense, the timing of their performance is more random and complex than that of a constant tempo musical performance. This randomness and complexity between performances makes it is impossible to systematically receive a set of acting performances, each recorded remote from other performances, and assemble the set of performances into an aligned ensemble of performances, much less do so in a way that systematically achieves a desired effect, or desired artistic expression, without the technologies provided herein.

Accordingly, those of skill in the art will appreciate having systems and methods that solve the longfelt and unsolved needs of providing an acting network in which (1) actors can be notified of audition opportunities; (2) actors can be provided tools to rehearse for a role independently; (3) actors can be provided tools to record performances; (4) actors can be provided tools to assess a recorded performance; (5) actors can be provided tools to produce and assemble an ensemble of performances, each obtained from actors at locations remote from other actors in the ensemble; (6) actors can be provided tools to adjust a performance or ensemble of performances to obtain a desired effect or artistic expression; (7) actors can be provided tools to assess performances by select acting criteria, and/or upload the performance to a system for a review by others; (8) a more cost-effective way is provided to audition a greater number of actors than a traditional "shared location" audition that requires travel out of city, out of state, or out of country; (9) a vast number of ensembles of actors can be created from the permutations of possible combinations of actors made possible through the network; and (10) prescreening of performances is automated using select criteria to reduce the number of manual performance reviews.

SUMMARY

Systems and methods are provided for aligning and assembling an acting performance embodied on a computer readable medium with a complementary event or series of events embodied on a computer readable medium. The complementary event or series of events can include one or more additional acting performances. The systems and methods taught herein include assembling, displaying, and evaluating an ensemble of acting performances that include a plurality of submissions from remote locations uploaded through a network to a director for the assembly. The systems and methods taught herein provide a way to create any of a vast number ensembles of actors that are made possible by the permutations of possible combinations of actors that can be brought together virtually; and provide a way to automatically prescreen the performances of actors to reduce the number of manual reviews required from the vast number of auditions submitted. In some embodiments, the systems and methods provided herein make auditions so easy to find and enter, and costs so low to operate, that a sort of massive multi-player online environment (MMO) to the acting industry is provided through the technologies presented.

An ensemble of performances can be assembled, and each performance in the ensemble can be created in a digital format at a location remote from each of the other performances and uploaded for assembly into the ensemble by a computer software. Actors can record their performance on computer readable media at any remote location, and upload their performance into one of the systems taught herein for assembly into any desired ensemble. Their performance can be assembled with any one or more other performances obtained from other actors participating in the same manner from their respective remote locations. Actors can audition from any location in the world without requiring travel, and their performance can be screened on it's own merits, or screened as a part of any one or more compilations of performances in the search for a desired ensemble of actors.

In some embodiments, systems are provided for aligning and assembling an acting performance with a complementary series of events. The systems can include a processor; and, a memory that includes an acting module embodied on a non-transitory computer readable medium and operable to receive acting performances as a data file of a remotely recorded performance and, a data file of a complementary series of events; and, an assembly engine embodied on a non-transitory computer readable medium and operable for assembling the remotely recorded performance with the complementary series of events. In these embodiments, the assembling can include assigning a timing segment to a script to contain the remotely recorded performance and the complementary series of events, the timing segment configured with a timeline to align the location and duration of the data files in the timing segment for the assembling. The assembling can also include assigning a digital pace-setter to the timing segment, the digital pace-setter having a fixed position and fixed duration on the timeline, the fixed position configured to express a desired effect from the acting performances in the timing segment, and the fixed duration configured to contain the remotely recorded performance and the complementary series of events.

In some embodiments, the pace-setter is selected from the group consisting of a pace-setting performance, a pace-setting visual event, a pace-setting audio event, a pace-setting scripted time-frame, and a pace-setting subjective time frame; wherein, the start of the digital pace-setter is bounded on the timeline by a fixed start tag (a digital index), the stop of the digital pace-setter is bounded by a fixed stop tag (another digital index), and the duration of the pace-setter does not exceed the duration of the timing segment.

The assembling can also include calibrating the digital pace-setter to the acting performances to align the acting performances for the assembly. In some embodiments, the calibrating can include assigning a start pacing index on the digital pace setter that correlates with a start pacing index on the remotely recorded performance; assigning a stop pacing index on the digital pace setter that correlates with a stop pacing index on the remotely recorded performance within the timing segment. Likewise, the calibrating can include assigning a start pacing index on the digital pace setter that correlates with a start pacing index on the complementary series of events; assigning a stop pacing index on the digital pace setter that correlates with a stop pacing index on the complementary series of events within the timing segment. As a result, the calibrating can include aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds tolerable limits, moving the stop pacing index on the remotely recorded performance to align with the position of the stop pacing index of the digital pace-setter. Likewise, the calibrating can include aligning the complementary series of events with the digital pace-setter, the aligning including fixing the position of the start pacing index of the complementary series of events at the correlating start pacing index on the digital pace-setter, measuring the distance on the timeline between the position of the stop pacing index of the complementary series of events and the position of the correlating stop pacing index on the digital pace-setter and, when the distance exceeds tolerable limits, moving the stop pacing index on the complementary series of events to align with the position of the stop pacing index of the digital pace-setter.

The systems can also include a display module for displaying the remotely recorded acting performance with the complementary series of events after the assembling by the assembly engine; and, a database embodied on a non-transitory computer readable medium and operable to store data.

The systems and methods are configured to assemble remotely created data packages on a timeline to create a desired effect, such as an artistic expression. Since the data package can be acting performances, the desired effect can be obtained in the process of creating an ensemble of acting performances using the systems provided herein. As such, in some embodiments, the complementary series of events includes a second recorded performance.

The data packages can be received in any of a number of digital formats. As such, the acting module, or audition module in some embodiments, can be configured to convert file formats to a desired file format for use by the assembly engine, or meshing engine in some embodiments.

In some embodiments, the systems can further include an assessment module on a non-transitory computer readable medium and operable to receive alignment information from the assembly engine to provide an assessment of each of the remotely recorded performances. In some embodiments, the assessment module can be operable to measure voice inflection, volume, and the like, to provide an assessment of the remotely recorded performances, where a desired voice inflection, volume, and the like, can be mapped and compared to the performance. A reviewer can select any one or any combination of performance parameters for assessment.

In some embodiments, the assessment module can be operable for calculating a performance rating for each performance based on measurable acting parameters selected from the group consisting of timing, pace, voice volume, voice inflection, and consistency. And, in some embodiments, the assessment module can be operable for providing a real-time streaming of the acting performances for a real-time review by a casting director.

The recordation of a performance can be done through the acting module or audition module. However, in some embodiments, the systems can further comprises a recording module on a non-transitory computer readable medium and operable to record the remotely recorded performance. The recording module can provide additional features directed to modifying or correcting a digital performance file before an actor uploads the performance file for use by the systems and methods provided herein.

Likewise, a dedicated module can be created to improve upon the editing options available through the recording module. In some embodiments, the systems can further comprise an enhancement module on a non-transitory computer readable medium operable for enhancing audio or video data in the remotely recorded performance to create a desired effect from a performance. The enhancement module can provide a robust range of editing features for the audio and the video data. Such controls may include brightness, contrast, volume, resolution, the speed of playback, and the like. In some embodiments, the systems and methods can adjust the performances to meet performance parameters, for example, adjusting the start and stop of the performances to meet targeted start and stop points, adjusting the speed of the performance to meet targeted performance times, adjusting the volume of a voice to adjust the relative gain in the output for screening the performance alone or assembling the performance into an ensemble, and the like.

The actors are performing at locations remote from each other and can benefit from a feature that helps them read their lines by providing them with an actor performing lines with them in a performance as an accompanying reading. As such in some embodiments, the systems can further include a reading module on a non-transitory computer readable medium operable for providing a computer reading of an accompanying part in a script to assist in the creation of the remotely recorded performance. In some embodiments, the accompanying reading can be text only, such as a text scrolling on a screen at a desired pace, much like what is seen in a karaoke feature. In some embodiments, the accompanying reading can be from a pre-recorded actor, whether an amateur actor or a professional actor. In some embodiments, the professional actor can be performing a scene that was pre-recorded and repurposed for use in the systems and methods taught herein. For example, the actor may be predeceased, and his/her performance repurposed for use as an example performance to follow, or for use as an accompanying reading. In some embodiments, the accompanying reader can be voice only or voice and video. In some embodiments, the accompanying reading can be from an avatar. In some embodiments, the reading can be obtained in any of a variety paces and inflections to reflect a variety of performance styles that may be desired from a reviewer.

The systems are used in the methods of assembling the data packages. In some embodiments, the methods include creating a remotely recorded performance to assemble with a complementary event or series of events, such as another acting performance. In some embodiments, the methods include obtaining one of the systems taught herein, obtaining a script having a timing segment including a performance to perform; and, recording a performance. The recording is done at a location remote from another actor and can include identifying performance parameters that include the start of the performance, the stop of the performance, and the duration of the pace-setter; performing the performance in a time that does not exceed the duration of the pace-setter; and, creating a digital data file of the remotely recorded performance to upload to the acting module.

Since the systems and methods can provide a screening and assessing feature for performances, the methods can include assessing the remotely recorded performance. As such, the methods can further include uploading the remotely recorded performance to the acting module; assembling the remotely recorded performance with the complementary series of events. The systems and methods can be configured to provide measured information from a performance, so the method can include reviewing information from the assessment module for the timing segment including the distance measured on the timeline between the position of the stop pacing index of the remotely recorded performance and the position of the correlating stop pacing index on the digital pace-setter. The reviewing can include determining whether the distance exceeded tolerable limits. And, the reviewing can more specifically include reviewing the performance rating based on measurable acting parameters selected from the group consisting of timing, pace, voice volume, voice inflection, and consistency. In some embodiments, the reviewing can include determining whether the performance rating meets desired performance expectations.

The systems assemble the data packages of a remotely created acting performance and a complementary event or series of events, which can be another acting performance. As such, in some embodiments, the methods can include assembling a remotely recorded performance with a complementary series of events. The methods can include obtaining a system taught herein; obtaining a script; receiving acting performances, each as a data file. The data files can be a remotely recorded performance and, a data file of a complementary event or series of events, which can be another remotely recorded performance.

Naturally, the methods can include assembling the remotely recorded performance with the complementary series of events. In these embodiments, the assembling can include assigning a timing segment to the script to contain the remotely recorded performance and the complementary series of events. The timing segment can be configured as a desired duration on a timeline that was selected to align the location and duration of the data files in the timing segment for the assembling. The assembling can also include assigning a digital pace-setter to the timing segment, the digital pace-setter having a fixed position at least on one point on the timeline in the timing segment, and a fixed duration on the timeline. Although the pace setter should eventually have at least two fixed points, it can be configured to be adjustable to help obtain the desired effect from the assembled acting performances. As such, the fixed position of the pace setter can be configured to express a desired effect from the acting performances in the timing segment. The fixed duration of the pace setter is configured to contain the remotely recorded performance and the complementary series of events.

In some embodiments, the pace-setter is selected from the group consisting of a pace-setting performance, a pace-setting visual event, a pace-setting audio event, a pace-setting scripted time-frame, and a pace-setting subjective time frame.

The duration and position of the pace setter on the timeline can mechanically configured using the digital structure of the data packages. The start of the digital pace-setter can be bounded on the timeline by a fixed start tag, for example, and the stop of the digital pace-setter can be bounded by a fixed stop tag, as long as the duration of the pace-setter does not exceed the duration of the timing segment. As noted, the duration and position of the pace setter, although eventually fixed for purposes of assembling data packages on the timeline, can remain adjustable for purposes of flexibility in the assembly of the data packages to obtain the desired effects, in some embodiments.

In some embodiments, the methods including calibrating the digital pace-setter to the acting performances to align the acting performances for the assembly. The calibrating can include assigning the start pacing index on the digital pace setter to correlate with the start pacing index on the remotely recorded performance; and, assigning the stop pacing index on the digital pace setter to correlate with the stop pacing index on the remotely recorded performance within the timing segment.

The calibrating can also include assigning the start pacing index on the digital pace setter to correlate with the start pacing index on the complementary series of events; and, assigning the stop pacing index on the digital pace setter to correlate with the stop pacing index on the complementary series of events within the timing segment.

In some embodiments, the methods can also include aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds tolerable limits, moving the stop pacing index on the remotely recorded performance to align with the position of the stop pacing index of the digital pace-setter.

Likewise, the methods can include aligning the complementary series of events with the digital pace-setter, the aligning including fixing the position of the start pacing index of the complementary series of events at the correlating start pacing index on the digital pace-setter, measuring the distance on the timeline between the position of the stop pacing index of the complementary series of events and the position of the correlating stop pacing index on the digital pace-setter and, when the distance exceeds tolerable limits, moving the stop pacing index on the complementary series of events to align with the position of the stop pacing index of the digital pace-setter.

The methods can be configured to include displaying the remotely recorded acting performance with the complementary series of events after the assembling by the assembly engine. In some embodiments, the complementary series of events includes a second recorded acting performance.

Acting is ordinarily done by following a script, and the scripts can also be created in any number of digital formats. The systems and methods provided herein include system components and steps for creating a script. The acting module, or audition module in some embodiments, is further operable to receive a script and/or display the script on a video display, as the script can be received in any standard script format known to those of skill and either accepted by the systems or converted by the systems into a more desirable format as needed. In some embodiments, methods that include obtaining a script can include creating the script.

As taught herein, the pace-setter can be any of many different types of digital data packages. In some embodiments, the pace-setter for the timing segment can be a pace-setting performance. In some embodiments, the pace-setting performance is a pre-recorded acting performance selected to achieve the desired effect for the timing segment. In some embodiments, the second recorded performance is assigned as the pace-setter.

As one timing segment can be assigned one pace-setter, a series of timing segments can be assigned a series of respective pace-setters, each timing segment in the series of timing segments having an independently selected pace-setter for the respective timing segment. In some embodiments, the pace-setter for each timing segment is independently selected to obtain an independently selected desired effect for the respective timing segment.

The systems and methods include a software component. As such, the teachings include a computer readable medium encoded with instructions for carrying out a process of assembling acting performances that include a remotely recorded performance. The instructions encode a process that includes assembling a remotely recorded performance with a second recorded performance. The assembling can include assigning a timing segment from a script to contain the remotely recorded performance and the second recorded performance, the timing segment configured with a timeline to align the location and duration of the data files in the timing segment for the assembling. The assembling can also include assigning a digital pace-setter to the timing segment, the digital pace-setter having a fixed position and a fixed duration on the timeline, the fixed position configured to express a desired effect from the acting performances in the timing segment, and the fixed duration configured to contain the remotely recorded performance and the second recorded performance.

In some embodiments, the digital pace-setter is selected from the group consisting of a pace-setting performance, a pace-setting visual event, a pace-setting audio event, a pace-setting scripted time-frame, and a pace-setting subjective time frame; wherein, the start of the digital pace-setter is bounded on the timeline by a fixed start tag, the stop of the digital pace-setter is bounded by a fixed stop tag, and the duration of the pace-setter does not exceed the duration of the timing segment.

The instructions encode a process that also includes calibrating the digital pace-setter to the acting performances to align the acting performances for the assembly. In these embodiments, the calibrating can include assigning the start pacing index on the digital pace setter to correlates with the start pacing index on the remotely recorded performance; assigning the stop pacing index on the digital pace setter to correlates with the stop pacing index on the remotely recorded performance within the timing segment; In these embodiments, the calibrating can also include assigning the start pacing index on the digital pace setter that correlates with the start pacing index on the second recorded performance; assigning the stop pacing index on the digital pace setter that correlates with the stop pacing index on the second recorded performance within the timing segment.

In these embodiments, the calibrating can also include aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds tolerable limits, moving the stop pacing index on the remotely recorded performance to align with the position of the stop pacing index of the digital pace-setter. Likewise the calibrating can also include aligning the second recorded performance with the digital pace-setter, the aligning including fixing the position of the start pacing index of the second recorded performance at the correlating start pacing index on the digital pace-setter, measuring the distance on the timeline between the position of the stop pacing index of the second recorded performance and the position of the correlating stop pacing index on the digital pace-setter and, when the distance exceeds tolerable limits, moving the stop pacing index on the second recorded performance to align with the position of the stop pacing index of the digital pace-setter;

Moreover, the software can include instructions for displaying the remotely recorded acting performance with the second recorded performance after the assembling by the assembly engine. In some embodiments, the complementary series of events includes a second recorded acting performance.

BRIEF DESCRIPTION OF THE DRAWINGS

FIG. 1 illustrates a scene with a single acting performance meshed with a complementary series of events, according to some embodiments.

FIG. 6 illustrates a script table that divides an act, which is a portion of a script defined by a set of scene sequences, each scene sequence defined by duration and location and divided into beats of defined durations and locations, according to some embodiments.

FIGS. 9A-D illustrate the process of creating a remotely recorded performance, adding other prerecorded performances to the remotely recorded performance, and aligning the performances with the duration of a pace-setter which, in this case is a pace-setting actor, according to some embodiments.

DETAILED DESCRIPTION

Figure 2:
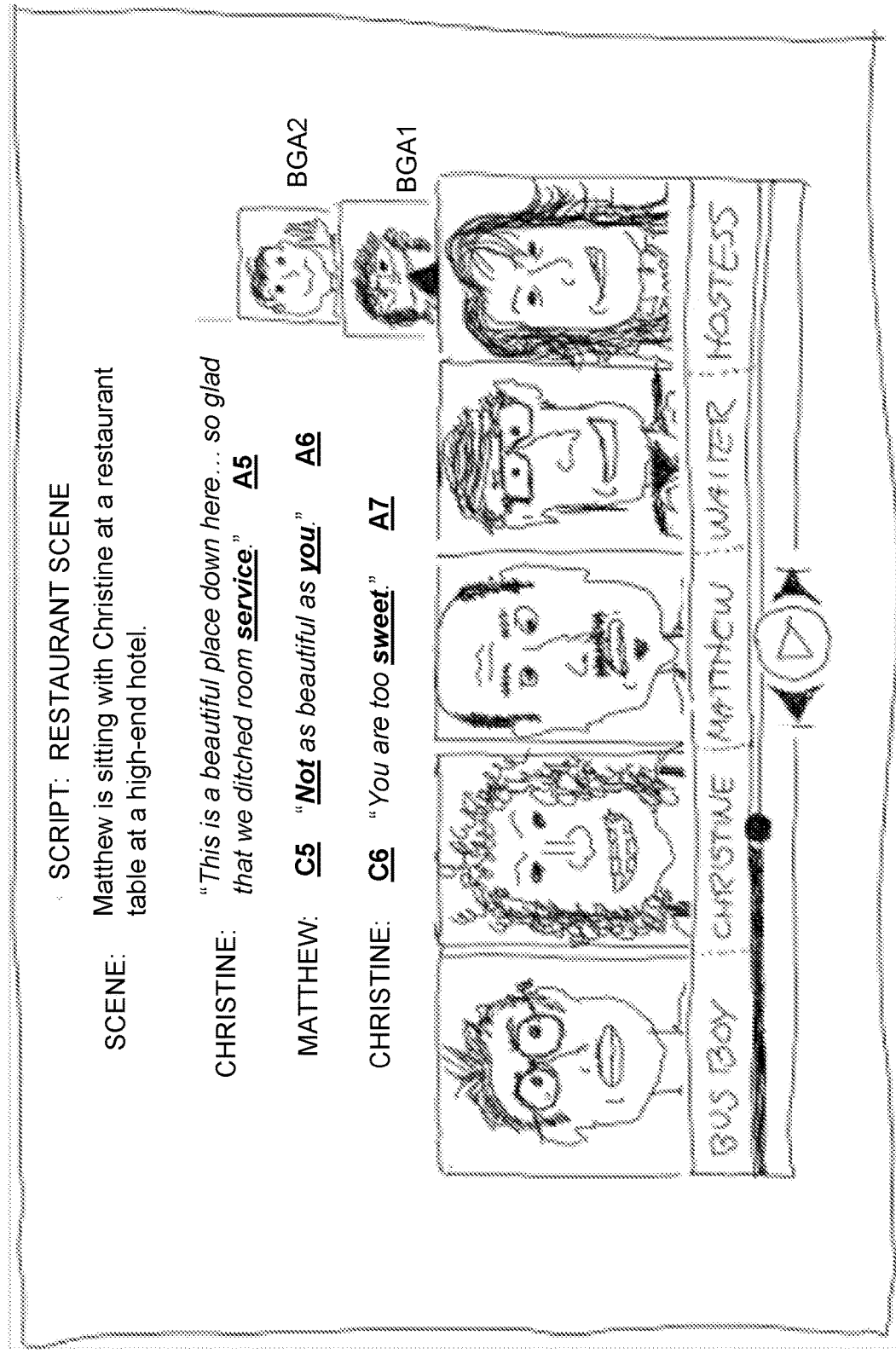
FIG. 2 illustrates a screenshot of a computer screen hosting multiple actors, where an acting performance is meshed with a plurality of additional acting performances, according to some embodiments.

Systems and methods are provided for aligning and assembling an acting performance embodied on a computer readable medium with a complementary event or series of events embodied on a computer readable medium. The complementary event or series of events can include one or more additional acting performances. The systems and methods taught herein include assembling, displaying, and evaluating an ensemble of acting performances that include a plurality of submissions from remote locations uploaded through a network to a director for the assembly.

An ensemble of performances can be assembled, and each performance in the ensemble can be created in a digital format at a location remote from each of the other performances and uploaded for assembly into the ensemble by a computer software. Actors can record their performance on computer readable media at any remote location, and upload their performance into one of the systems taught herein for assembly into any desired ensemble. Their performance can be assembled with any one or more other performances obtained from other actors participating in the same manner from their respective remote locations. Actors can audition from any location in the world without requiring travel, and their performance can be screened on it's own merits, or screened as a part of any one or more compilations of performances. The systems and methods taught herein provide a way to create any of a vast number ensembles of actors that are made possible by the permutations of possible combinations of actors that can be brought together virtually; and provide a way to automatically prescreen the performances of actors to reduce the number of manual reviews required from the vast number of auditions submitted. In some embodiments, the systems and methods provided herein make auditions so easy, and costs so low, that they deliver a sort of massive multi-player online environment (MMO) to the acting industry through the technologies presented.

It should be appreciated that the remotely performed acting performances assembled herein are data packages containing audio, video, and combinations of audio and video that are assembled into a coherent ensemble of performances on a timeline that can be recognized and tracked using a computer processor and memory. The assembling of the performances is an assembling of data packages along the timeline. The assembling uses the computer processor and memory to identify particular data in the data packages and particular points on the timeline to align the acting performances at particular points in time relative to each other and create a desired artistic expression. To do so, the systems and methods provided herein can use digital indices to mark the timeline and data packages, the placement of the marks used to program software that instructs the processor to align the acting performances as desired. There are several possible embodiments. The teachings will first introduce, generally, how to use indices to mark and assemble performances along a timeline to produce a desired effect or artistic expression. Then, the teachings will show how the timeline can be used to configure a desired set of timing segments on a script, the timing segments configured to encompass a pace-setter for all performances to follow, the pace setter having a duration that is equal to, or less than, the duration of the timing segment. It should be appreciated that the indices can be used in the assembling of the performances using the configuration of the timing segments and their respective pace setters.

Using Indices on a Timeline to Mark and Mesh a Remote Performance with a Complementary Event or Series of Events A script includes a story that is told on a timeline. Actors perform at points on the timeline, whether in series or in parallel. In some embodiments, an "index" or a set of "indices" can be placed between the lines spoken by actors to serve as a timing mark that may or may not include a desired delay between a spoken line and the timing mark. An index can be placed at any point on the timeline as a marker before, after, or during a spoken line to serve as an indicator of where a complementary event, or complementary series of events, should be placed in the assembly of the spoken line with the complementary event or complementary series of events. The index can be any digital marker that can be used as a time marker to assemble events, whether audio, video, a combination of audio and video, or a manually placed form of data that marks time on the timeline.

In some embodiments, the complementary event, or complementary series of events, can be a second acting performance. In some embodiments, the complementary event, or series of events, can be any digital event that occurs in series or in parallel with an acting performance, whether the digital even be audio, video, or a combination of audio and video.

FIG. 1 illustrates a scene with a single acting performance meshed with a complementary series of events, according to some embodiments. In FIG. 1, an actor is performing alone with the intent of meshing the performance with any desired, complementary series of events. The actor's script contains an acting index set, or "acting indices", and the complementary series of events contains a complementary index set, or "complementary indices". The complementary event, or complementary series of events, can be any series of events, each event having some digital form. An example of a complementary event can be any background that includes a second actor, a happening of any type, a gesturing of movements, a disaster, a location or change in location, a crowded room for a social gathering, and the like, each of which fits a digital profile that is labeled with an index. A series of complementary events are represented by a series of indices, complementary indices. The acting performance, for example, can include a first performance with physical acting or gesturing, spoken words, or perhaps a combination of physical acting and spoken words, for example, and the acting can be a digital form of recorded data labeled with indices, acting indices, for use in identifying where the labeled portion of the first performance occurs relative to unlabeled portions of the first performance, and used as a reference to a timeline shared with other actor's performances to be meshed with the first performance on the timeline.

In order to mesh the acting performance with the complementary series of events, the script can contain the acting indices and the complementary indices for use by a software that instructs the processor to mesh an actor's line with a complementary event, or a series of actors lines with a series of complementary events. That is, a meshing engine can be programmed to instruct the processor to identify corresponding indicia between the acting performance and the complementary series of events, and to align the acting performance with the complementary series of events using the corresponding indicia. And, in some embodiments, the script can map a network of indices for programming the meshing engine, in which the lines of actors carry indices as notation embedded in the script that can be read, analogous to a reading of musical notation in a piece of music, for example. In this way, each performance can be performed remote from the other performances and later assembled. The indices are placed by the system as desired, and the performances are later meshed by the meshing engine sending instructions to the processor to perform the meshing.

In FIG. 1, a busboy 102 takes a break and goes outside the restaurant to get some fresh air. The timeline 104 of events runs from left to right for the purpose of describing a simple use of indices. The duration of a line of an acting performance is the length of the solid line under the line of the performance, where 1 mm=1 sec. Likewise, the duration of a complementary even is the length of the dotted line under the complementary event, where 1 mm=1 sec. The vertical dashed lines show the alignment of an acting index with it's respective complementary index, where acting index 1 (A1) aligns with complementary index 1 (C1), acting index 2 (A2) aligns with complementary index 2 (C2), acting index 3 (A3) aligns with complementary index 3 (C1), acting index 4 (A4) aligns with complementary index 4 (C4), acting index 5 (A5) aligns with complementary index 5 (C5). To clarify, the start of the busboy's first line is that it's a beautiful storm, the busboy gazing at the sky, and the rain and lightning are aligned with the onset of that line by aligning A1 with C1. Next, there is a small time offset in which there is the sound of thunder, followed by the busboy saying "wow", and this is aligned by aligning A2 with C2, as shown by the small time gap, TG2, in FIG. 1, where A2 can be labeled with the time offset, or the processor can be programmed to align A2 with C2 having the time offset. Next, there is an offset between the onset of the silence, and the busboy showing alarm in the calm, and saying is line "uh oh . . . it's the calm before the storm", as shown by another small time gap, TG3, in FIG. 1. As before, this is aligned by aligning A3 with C3, where A3 can be labeled with the time offset, or the processor can be programmed to align A3 with C3 having the time offset. It should be appreciated that the time offset can be a default, or it can be set by an administrator, which can be a screenwriter or director, for example. The busboy then sees the formation of a tornado and screams "Ruuuunnnnn!", where A4 is aligned with C4, so that the sighting of the twister and the exclamation are aligned to occur as desired. The alignment of the indices can be referred to as "meshing" in some embodiments. It should be appreciated the indices A1, A2, A3, and A4 are used to align remote performances to complementary events, and the indices can be placed anywhere in the actor's remote performance, whether at the beginning, the end, or anywhere between, or perhaps before the beginning performance and placed with a desired time delay to the onset of the performance, or after the performance with a desired time delay after the end of the performance. A cooperative relationship is configured between the actor's indices A1, A2, A3, A4 and the complementary indices C1, C2, C3, C4, where the alignments are established as desired to achieve the desired assembly of the actor's performances and the complementary events or complementary series of events.

FIG. 2 illustrates a screenshot of a computer screen hosting multiple actors, where an acting performance is meshed with a plurality of additional acting performances, according to some embodiments. Each of the actors can be present real-time, or prerecorded, and the system and methods taught herein can align the performances either real-time or as prerecorded. One of skill will appreciate that the systems and methods generally taught with respect to FIG. 1 can be used, for example. Here, the busboy of FIG. 1 runs back into the restaurant to warn everyone about the tornado, and the following scene is taking place:

The scene is a restaurant scene with Christine, Matthew, a waiter, a hostess, and a pair of nameless, background actors. Each of the actors speak in series, with no overlapping of lines. The scene starts with Matthew and Christine sitting at a restaurant table at a high-end hotel. Christine says, "This is a beautiful place down here . . . so glad that we ditched room service." Here, a first acting index is placed on the timeline after Christine speaks the word "service", at which time Matthew's line is place by the system software to say, "Not as beautiful as you". A second acting index is placed after Matthew speaks the word "you", at which time Christine's line, "You are too sweet . . . " is placed by the system software. The waiter, hostess, and background actors BGA1, BGA2 do not have any spoken lines in this scene. Here, a third acting index is placed on the timeline after Christine speaks the word "sweet", at which time the system software places the busboy running into the restaurant and saying, "There's a tornado outside! Ruuuunnnn!". It should be appreciated that the system software can carry any label such as, for example, "alignment module", "alignment engine", "meshing module", "meshing engine", and the like, including any such label described herein for such a software function.

It should be appreciated that complementary lines can be labeled. That is, complementary indices can be placed to aid in the system placement of appropriate, complementary lines. After Christine speaks the word, " . . . service", perhaps labeled A5 for actor index 5, Matthew's line, "Not as beautiful as you.", can carry a complementary index C5, for example. Each complementary index can label the line as a whole, in which the complementary index can be placed at any point on the data package for the spoken line. In some embodiments, however, the complementary index can be placed at the start of the line as a more accurate point in time, where Matthew's spoken word "Not . . . " is labeled at the start of it's utterance, allowing the systems to more accurately place the start of the Matthew's line following the end of Christine's line. Likewise, after Matthew speaks the word " . . . you" an actor index 6, A6, can be placed, and Christine's line "You are too sweet." can carry a complementary index 6, C6, again either anywhere on the line to mark the data package, or at the start of the line to more accurately place the start of Christine's line. Likewise, after Christine speaks the word " . . . sweet" an actor index 7, A7, can be placed, and the Busboy's line "There's a tornado outside! Ruuuunnnn!" can carry a complementary index 7, C7 (not shown in FIG. 2), again either anywhere on the line to mark the data package, or at the start of the line to more accurately place the start of Christine's line.

The systems and methods can be configured to have instructions at each alignment to instruct the processor to align, or "mesh", the lines using any process chosen, whether by placement of data package as a whole spoken line, by a word within the line, or perhaps by a more resolute digital mark, such as the utterance of a sound at the start, or at the end, of a spoken line or word within the spoken line. As discussed herein, the instructions sent to the processor can include adjustment for time delays for better alignment control. The indices, for example, can be independently programmed to carry a desired time delay of any amount, whether a default selection, or a selection made manually by director, screenwriter, administrator, or the like. In some embodiments, the index can carry a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. In some embodiments, the processor is instructed by the meshing engine to use the time delay, rather than the index carrying the time delay. In some embodiments, the index can carry a time delay, and the processor can be instructed by the meshing to implement the time delay. Each of the time delays can be a default amount, or each of the time delays can be independently selected as desired. FIG. 2, for example, illustrates a system and method that uses the combinations of an actor index, Ai, and a complementary index, Ci. In particular, the software is programmed to recognize spoken words Again, as noted, the placement of Ai and Ci on the timeline can be used to configure a desired time delay, although the system can also be programmed to include the desired time delay regardless of exactly where Ai and Ci are placed on the timeline.

Figure 3:
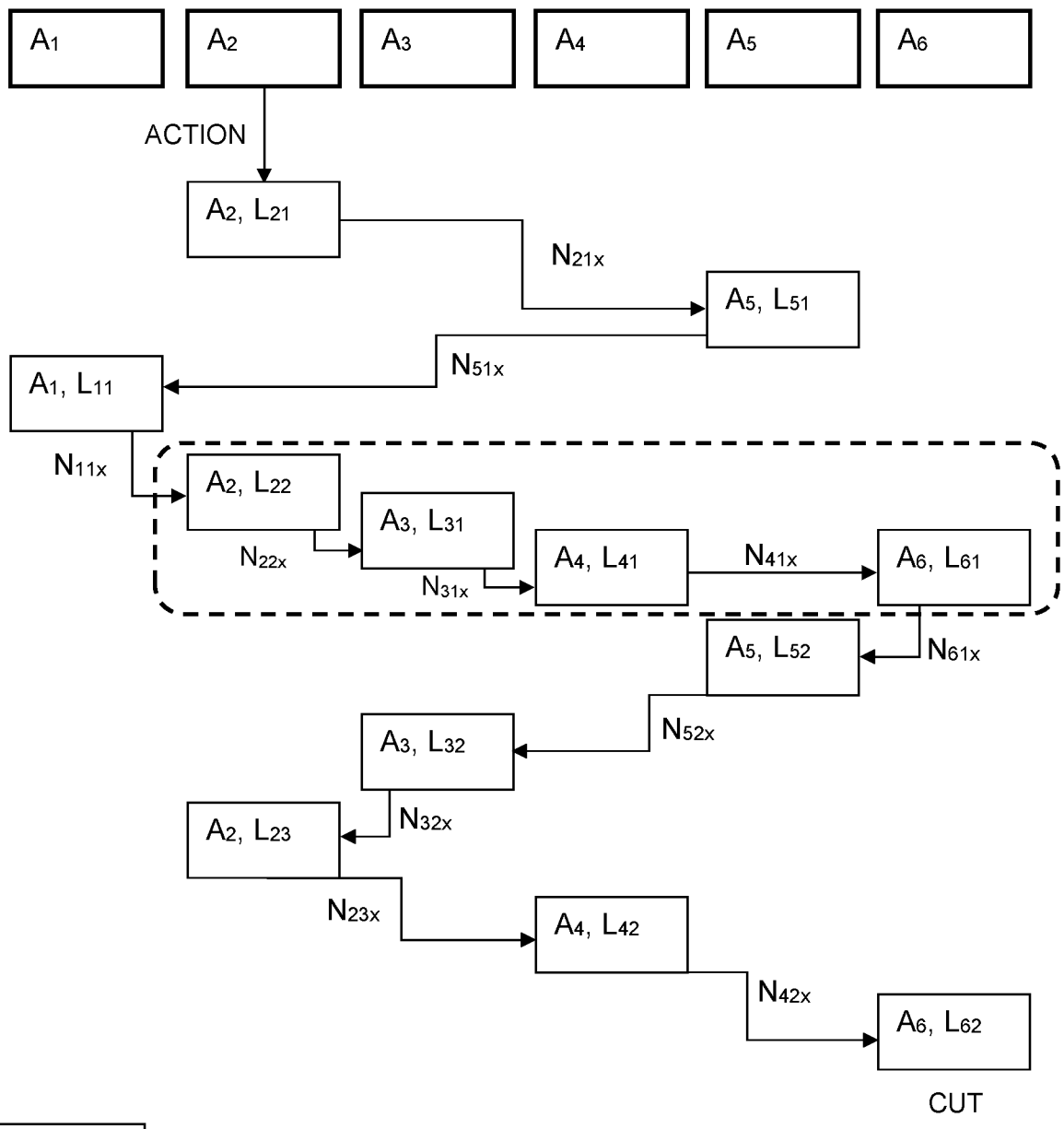
FIG. 3 illustrates a flowchart of actors speaking their lines in series and speaking their lines in an overlapping manner, according to some embodiments.

FIG. 3 illustrates a flowchart of actors speaking their lines in series and speaking their lines in an overlapping manner, according to some embodiments. In a manner similar to FIG. 2, actors A1, A2, A3, A4, A5, and A6 are represented on the screen. Ai, Lin represents actor Ai in frame to speak line Lin, where 'i' designates the actor, and 'n' represents the line spoken by Ai. The designators 'i' and 'n' can be an integer, letter, or other designator used by software instructions to instruct a processor to perform a function for that particular actor in that particular line. Each index, Ninxyz, is an index assigned to actor Ai, line Lin, otherwise designated as Ai, Lin. The designators x, y, and z, can be used as additional designators for additional indices as needed. In the dashed box, there are overlapping lines, where all actors in the box, ΣAi, speak overlapping lines, ΣLin, guided by indices, Ninxyz. FIG. 3 does not incorporate the use of complementary indices, Ci. However, one of skill will appreciate that FIG. 3 could use complementary indices as discussed with respect to FIG. 2, in some embodiments.

In FIG. 3, index, Ninxyz is depicted in limited for as Ninx, providing 'i' to indicated the particular actor, and providing 'n' to indicate the particular line for the particular actor. The subscript 'x' is provided for one additional degree of freedom, should the index require an additional descriptor during the placement of the indices by the director, screenwriter, administer, and the like. For example, the index Ninx can be seen figuratively as Nin---x, or x------Nin, where the relative lengths and placement of the dashes ('-') between "Nin" and "x" represent a desired time-delay that is placed before and/or after the index Nix. In some embodiments, the nomenclature Nin(+3) can be used to indicate a desired time-delay of 3 seconds after the placement of the index, or perhaps after the last sound produced in the data package of the prior spoken line. In some embodiments, the nomenclature Nin(−5) can be used to indicated a desired time delay of 5 seconds before the first spoken sound in the subsequent line, or perhaps after the placement of the index. One of skill will appreciate that any method of incorporating a desired time delay through the placement of the index can be used, as any such time-delay is a mere function of the computer clock for the timeline and system programming for instructing the process in the alignment or meshing of data packages or discrete pieces of data in the assembly of the performances.

As shown in the flowchart of FIG. 3, A2 speaks line 1, or L21, the first line for A2. An index for A2, L21 is placed after the line is spoken, and this index, N21x can be placed at any desired time after A2, L21, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. Next, A5 speaks line L51, and this is aligned with index N21, either directly in time with the onset of index N21x or at any desired time after N21x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. An index N51x can be placed at any desired time after A5, L51, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. Next, A1 speaks line L11, and this is aligned with index N51x, either directly in time with the onset of index N51x or at any desired time after N51x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. An index N11x can be placed at any desired time after A1, L11, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. These first 3 actors, A2, A5, and A1 all speak in series with no overlap.

The dashed box in FIG. 3 is a particular timeframe on the timeline in which actors A2, A3, A4, and A6 are desired to speak in an overlapping manner, and the system can place the indices accordingly, so that the processor is instructed to place the actor's lines together in the desired overlapping manner. In some embodiments, for example, A2 speaks it's second line, L22 and index N22x is assigned at a desired point within line L22 to align the onset of the first line of actor 3, A3, L31, with N22x. Likewise, index N31x is assigned within L31 for actor A3 to align the onset of the first line of actor 4, A4, L41, with N31x. Consistently, index N41x is assigned within L41 for actor A4 to align the onset of the first line of actor 6, A6, L61, with N41x.

Then, outside the dashed box, the system instructs the processor that the actors are to return to speaking in series. For example, index N61x is assigned at a desired time after A6, L61, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. A5 speaks second line L52, and this is aligned with index N61x, either directly in time with the onset of index N61x or at any desired time after N61x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. An index N52x can be placed at any desired time after A5, L52, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. A3 speaks second line L32, and this is aligned with index N52x, either directly in time with the onset of index N52x or at any desired time after N52x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. An index N32x can be placed at any desired time after A3, L32, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay.

A2 speaks third line L23, and this is aligned with index N32x, either directly in time with the onset of index N32x or at any desired time after N32x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. An index N23x can be placed at any desired time after A2, L23, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. A4 speaks second line L42, and this is aligned with index N23x, either directly in time with the onset of index N23x or at any desired time after N23x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. An index N42x can be placed at any desired time after A4, L42, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay. A6 speaks second line L62, and this is aligned with index N23x, either directly in time with the onset of index N42x or at any desired time after N42x, such as a time delay ranging from 0 seconds to 1 second, 2 seconds, 3 seconds, 4 seconds, 5 seconds, 6 seconds, 7 seconds, 8 seconds, 9 seconds, 10 seconds, or any amount therein in increments of 0.1 second. Likewise, the processor can instructed by the meshing engine to implement the time delay, rather than the index carrying the time delay.

It should be appreciated that the systems and methods can be programmed to recognize characteristic digital packages to align performances, and any digital package can be used in the aligning, whether the package be a whole line, a word, or the utterance of a sound at the start, or end, of a line. In some embodiments, a complementary series of events can be used to place an index for use in an alignment, and any event can be used whether audio or video or a stationary image. As such, the recognition of a digital item can be a recognition of audio, or video, or a stationary image, or silence . . . or the absence of any data on the timeline, or it can also be the deliberate placement of data that is neither audio or video, or a stationary image, or even silence. Examples of the foregoing can include spoken words, gestures, a sound or image of a disaster, such as a fire, a storm, a violent accident, and the like; or, a beautiful place, a crowded room for a social gathering, a body of water, a sky, a forest, a house, a building, the sun, and the like. And, the skilled artisan will appreciate that the computer clock can run on the timeline without the presence of any data, or that data that is neither audio nor video can be added to the timeline as an index. As such, any type of digital mark(s) can be used alone, together, in parallel, or in series, to align performances. In some embodiments, the system can use image recognition to align performances. In some embodiments, the system can use sound recognition to align performances.

Figure 4:
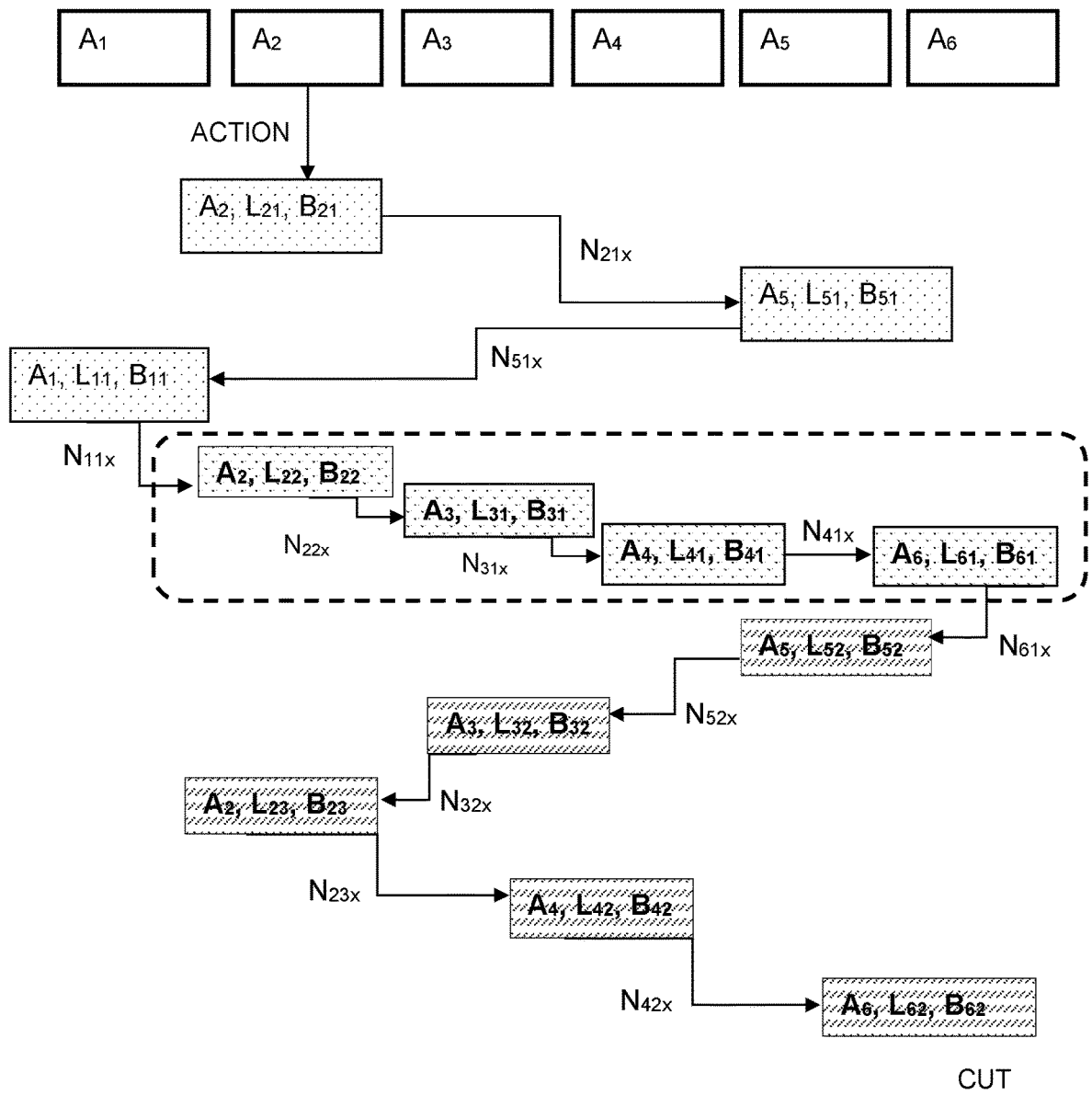
FIG. 4 illustrates a flowchart of actors speaking their lines in series and speaking their lines in an overlapping manner, adding backdrops/backgrounds as digital packages that help align the performances with the indices, according to some embodiments.

FIG. 4 illustrates a flowchart of actors speaking their lines in series and speaking their lines in an overlapping manner, adding backdrops/backgrounds as digital packages that help align the performances with the indices, according to some embodiments. FIG. 4 is deliberately configured in the same manner as FIG. 3 to simplify the teaching of the addition of images which, in this case, are backdrops to the scenes. The addition of 3 backdrops in FIG. 4 instructs the system of an additional parameter, perhaps distinguishing speaking lines in series from speaking with overlapping lines, and this may queue the system to handle the overlapping audio in a different way, perhaps through the adjustment of gain for the speaking actor for clarity of speech. In some embodiments, perhaps the backdrop can queue the system to alter the lighting, brightness, contrast, and the like for the change in backdrop. In some embodiments, the change in backdrop can initiate the onset of a timer for the desired placement of an index. As shown in FIG. 4, the backdrops can serve as their own indices, and they can be specific to each particular actor, where backdrop Bin represents a particular backdrop index for actor Ai, Lin.

Figure 5:
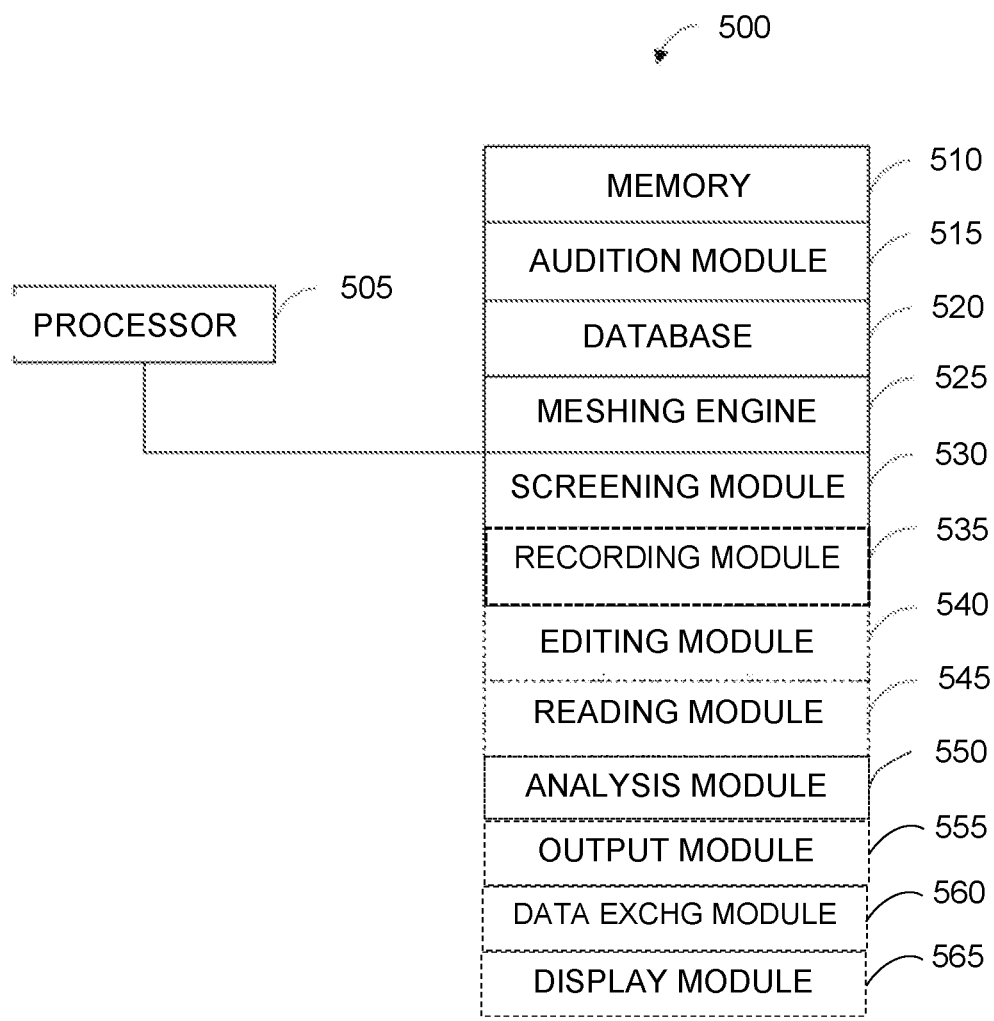
FIG. 5 illustrates a processor-memory diagram to describe components of systems taught herein, according to some embodiments.

FIG. 5 illustrates a processor-memory diagram to describe components of systems taught herein, according to some embodiments. The system 500 shown contains a processor 505 and a memory 510 (that can include non-volatile memory), wherein the memory 510 includes an audition module or acting module 515 operable to interface with a remote actor, a database 520 operable for storing system data, including data from a remote actor, a meshing engine 525 operable for meshing together the performance of a remote actor with a complementary event, a screening module 530 operable for screening the performance of a remote actor, and, optionally, a recording module 535 operable for recording the performance of a remote actor, an editing module 540 operable for editing the performance of a remote actor, a reading module 545 operable for assisting a remote actor in a performance by providing an assisted reading by text or audio, an analysis module 550 operable for analyzing the performance of a remote actor, and an output module 555 operable for an output of data from the system, which can include an upload to a local drive, a network, the internet, or the cloud; a local video display or audio output, and the like. In some embodiments, the system can include a data exchange module 560 operable for exchanging data from the system with data from another system including an online social network for users of the system. In some embodiments, the system can include a display module 565 for display of data, including the performance of a remote actor, a display of analysis parameters from the analysis module, and the like. The display module 565 can display video, for example, and can also be a part of the output module 555. The data exchange module 560 can be operable to exchange data with external computer readable media. All memory, such as the engines and modules, for example, are embodied in a non-transitory computer readable medium.

The system can include input/output devices (not shown) operable to receive and audio data or video data on a non-transitory computer readable medium, such as the data exchange module 560. Examples of input devices are operable to interact with external data formats, voice-recognition software, a hand-held device in communication with the system including, but not limited to, a microphone, and the like, as well as a camera or other video image capture and transmission device. It should be appreciated that the input and output can be an analog or digital audio or video, The database 520 is operable to store data on each user of the system for access on a non-transitory computer readable storage medium. Any digital data can be stored and accessed, including text files, as well as audio or video files known to one of skill in the art. As such, sound files, text files, image files, and the like can be processed. In some embodiments, the system can access any of a variety of accessible data through a data exchange module, as discussed above.

As such, the systems and methods can be configured for meshing an acting performance with a complementary series of events through a computer network. In these embodiments, the acting performance and the complementary series of events can each be created remote from the other. The systems include a processor and a memory.

In some embodiments, the memory can include
   an audition module embodied on a non-transitory computer readable medium and operable to accept an audiovisual data file of an acting performance;
   a database embodied on a non-transitory computer readable medium and operable to store data; and,
   a meshing engine embodied on a non-transitory computer readable medium and operable for meshing the acting performance with a complementary series of events.

In some embodiments, the meshing can include aligning
   an acting index set, $N_A inxyz$, embedded in the acting performance, where i is a numerical identifier for the acting performance, n is the line in a series of lines for the acting performance, and x, y, and z are indices in the line;

with
   a complementary index set, $N_C inxyz$, embedded in the complementary series of events, where i is a numerical identifier for the acting performance, n is the line in a series of lines for the acting performance, and x, y, and z are indices in the line;

where each index in the acting index set aligns with a respective complementary index in the complementary index set for meshing the acting performance with the complementary series of events;

In some embodiments, the systems and methods can further include a screening module embodied on a non-transitory computer readable medium and operable to screen the meshing of the trial acting performance with the complementary series of events on a graphical user interface.

Each acting index and complementary index (i) can be obtained from within a script that details the acting performance and the complementary series of events and (ii) can be selected from the group consisting of a key word; a key phrase; a period of silence having a select duration; a defined audio sound; a defined visual effect; and, activation of a switch.

In some embodiments, the acting performance and the complementary series of events can each be created independently and remote from the other at differing times and/or places; and, in some embodiments, the system can be configured to enable a review of the acting performance meshed with the complementary series of events.

It should be appreciated that a complementary series of events, or a complementary event, can be any digital package. In some embodiments, the complementary series of events, or complementary event, includes a second acting performance.

In some embodiments, the acting module can be configured to receive each of the acting performance and/or the second acting performance in a respective submitted format, the acting module operable for (i) recognizing each of the respective submitted formats and (ii) converting each of the respective submitted formats to a desired system format, as needed, for use by the meshing engine.

In some embodiments, the system can be configured to further comprise a script module embodied on a non-transitory computer readable medium and operable to receive a script, print a script, and/or display a script on the graphical user interface. The systems and methods can be configured to operate through the formatting of a script and, in some embodiments, the systems and methods can be configured to accept all standard script formats known to those of skill in the art. In some embodiments, the script formats are digital. In some embodiments, the script can be scanned into the system in an image format and converted to a desired digital format for configuring for use by the systems.

In some embodiments, the acting module is operable for (i) recognizing script formats and (ii) converting the script format to a desired system format, as needed, for use by the script module.

It should be appreciated that, due to the remote nature of the acting submissions, there is value in configuring the system to operate with pre-recorded performance, or in real-time. As such, in some embodiments, the system enables a real-time meshing and screening of the acting performance.

In some embodiments, the system further comprises a recording module embodied on a non-transitory computer readable medium and operable to record the acting performance or the second acting performance.

In some embodiments, the system further comprises an editing module on a non-transitory computer readable medium operable for removing or inserting one or more additional acting tracks to create a desired ensemble of acting performances.

In some embodiments, the system further comprises a reading module on a non-transitory computer readable medium operable for providing a computer reading to accompany the acting performance.

In some embodiments, the system further comprises an analysis module on a computer readable medium operable for (i) a system calculation of a performance rating based on select acting parameters; or, (ii) submitting the acting performance for a review by an administrator. (e.g., rush/drag with respect to overall performance speed, and with respect to indices)

In some embodiments, the system further comprises an analysis module on a computer readable medium operable for (i) a real-time system calculation of a performance rating based on select acting parameters; or, (ii) a real-time streaming of the acting performance for a real-time review by an administrator, (e.g., rush/drag with respect to overall performance speed, and with respect to indices).

It should be appreciated that the indexing references created and used in the systems and methods can be any digital index desired. In some embodiments, the indexing reference is the key word or the key phrase. In some embodiments, the indexing reference is a select audio digital package. In some embodiments, the indexing reference is a select visual data package.

It should be appreciated that an administrator, director, screenwriter, and the like, may choose to index the assembly of performances manually. As such, in some embodiments, the indexing reference is the activation of a switch.

As noted, methods of recording an acting performance for including in an ensemble of acting performances in a scene are provided herein. The methods can include obtaining a system taught herein;
obtaining a script that includes (i) lines for the acting performance and the complementary series of events; and, (ii) indices for meshing the acting performance with complementary series of events with the meshing engine;
loading the script into the system for use by the meshing engine; and,
recording the acting performance or the second acting performance with the recording module.

In some embodiments, the complementary series of events includes a second acting performance. In some embodiments, the methods further include submitting the acting performance for a review by an administrator using the analysis module. And, in some embodiments, the methods further include recording a plurality of takes of the acting performance with the recording module; choosing a select performance within the plurality of takes for a review by an administrator; and, submitting the select performance for the review by the administrator with the analysis module.

As noted, methods of reviewing an acting performance are also provided. In some embodiments, the methods can include obtaining a system taught herein;
obtaining a script that includes (i) lines for the acting performance and the complementary series of events; and, (ii) indices for meshing the acting performance with complementary series of events with the meshing engine;
loading the script into the database for use by the meshing engine;

accepting the audiovisual data file of the acting performance with the audition module;

loading the acting performance for a meshing of the acting performance with the complementary series of events; and, reviewing the acting performance.

In some embodiments, the complementary series of events includes a second acting performance. And, in some embodiments, the second acting performance can include a computer reading of the lines of the second acting performance by a reading module on a non-transitory computer readable medium operable for providing a computer reading to accompany the acting performance.

The Use of Timing Segments to Contain Pace-Setters for Aligning and Setting the Pace of Performances to Aid in Obtaining a Desired Effect or Desired Artistic Expression As taught above and illustrated in the figures, indices can be used to mark whole lines within performances, words within lines, the utterance of the end of a word or the start of a word, or any digital event. The digital event can be a complementary event, and/or complementary series of events. All marked digital events can be used for identification, alignment and assembly of remotely performed performances by the system. Interestingly, rather than mark the performances by line, word, utterance, and the like, the performances can be marked in a more subjective manner, using what are referred to herein as "timing segments", "acting segments", or "segments" that are chosen by anyone having the control to do so. In some embodiments, the timing segments can be designed by a screenwriter, director, producer, administrator, or any person having the control to alter the way in which performances are aligned to obtain a desired effect or desired artistic expression.

As explained in detail herein, the indices provide a tool that allows for the assembly of an ensemble of remotely performed acting performances. This section teaches embodiments that use indices to frame timing segments as independently selected blocks of time along a timeline, rather than to mark single points in time between spoken lines as taught in the section above.

In some embodiments, the timing segments can be used to simplify the alignment and assembly of the remotely performed performances. In some embodiments, establishing a timing segment includes establishing a "pace-setter", which is a block of time or timing segment that is used to set the pace for other performances in that timing segment. The pace-setter can be any digital event, or series of events, occurring over a time as long as, or longer than, the passage of time of a second event or series of events, sometimes referred to as a complementary event or series of events. As such, the block of time surrounding the pace-setter encompasses the block of time surrounding the complementary event or series of events. With this configuration, the block of time selected for the pace-setter can be equal to the block of time selected for the respective timing segment. In some embodiments, the block of time selected for the pace-setter can be less than the block of time selected for the respective timing segment. In any event, the mechanism is that the block of time established for the pace-setter can be selected to set the pace for the complementary event or series of events, in some embodiments. Rather than indexing a series of events, or events occurring in parallel, each of the timing segment can be framed as the respective block of time that encompasses all performances within that timing segment, such that acting performances and complementary events that occur within the timing segment are guided by the pace of the pace-setter that is measured by the clock of the computer running the operation of such systems and methods that are used to align the performances.

The pace setter can be any digital package that marks the passage of time and, thus, can be used as a way to set the pace in the respective timing segment. In some embodiments, the pace-setter can be a background event that serves as a pace-setting timeline for an actor to follow when making a performance. In some embodiments, the background event can be a soundtrack, or mere audio. In some embodiments, the background event can be a video display. In some embodiments, the background event can include a gesture or set of gestures, including physical acting or dancing. And, in some embodiments, the background event can be any digital marking used on the timeline by a director, screenwriter, administrator, and the like, whether or not the digital marking provides any audible audio sound or visible video image. In some embodiments, the background event can be silence for a desired period of time. As such, it should be appreciated that, in some embodiments, the pace-setter can be framed by any digital event, whether audio or visual, or manually introduced as some digital framing for a desired block of time. The pace-setter can include even a period of silence, and perhaps an absence of motion, in some embodiments.

The pace-setter can be a pace-setting actor that sets the pace for the respective segment through the pace-setting actor's performance. It should be appreciated that the pace-setting actor can be any actor in the assemblage of performances. In some embodiments, the pace-setting actor can be a supporting actor. In some embodiments, the pace-setting actor can be a lead actor. In some embodiments, the pace-setting actor can be a background actor. The terms "pace-setter" and "pace-setting actor" can be used synonymously in some embodiments.

The pace-setter can help contribute to achieving a desired effect, or desired artistic expression, by providing more guidance for the timing aspects of the expression. The script is designed to achieve an overall desired effect, and the timing segments and pace-setters within the timing segment can be selected and configured to help achieve the overall desired effect of the script. In some embodiments, the overall desired effect can be the total effect experienced. For example, the overall desired effect can be a cumulative effect obtained from a series of desired effects that are sought over the course of the script from the segments, either as a series of single segments, batches of segments, or a combination of single segments and batches of segments. In fact, a "desired effect" can be any effect known to the skilled screenwriter, director, administrator, and the like. A producer can be considered an administrator, in some embodiments. The following testimony captures the essence of how timing can produce a desired effect:

> Well, when it comes to timing for actors and comedians, casting veteran James Levine has to agree. "Timing is everything," he insists. "Some people have such a natural ability with timing, pace, and rhythm, they captivate audiences without needing to practice them at all. Others, however, struggle to learn these aspects of performing and have to purposefully experiment with them for years." Levine says, "You can't always teach timing fully. You can teach the idea of it. And then people feel it or they don't." Says comedian Jerry Seinfeld . . . . If the rhythm isn't just right, if it's a little long—the pause in between the setup and the punchline-if it isn't just right, it doesn't get a laugh. And I don't know why. But I know what's right and when it's not right." "Finding an unusual pace and timing to a scene can make [a performance] blossom," Levine says." See, for example, https://castingfrontier.com/what-is-timing-for-an-actor-bring-it-episode-18/(downloaded Feb. 9, 2023)

As such, the pace-setter can provide a key ingredient to a performance or set of performances that form a part of a script. There are six main parts in a play script: plot, exposition, dialogue, conflict, complication, and climax. In some embodiments, the desired effect can include scene function, plot/subplot, character development, theme, or some combination of these desired effects. In some embodiments, the combination can include scene function and plot/subplot. In some embodiments, the combination can include scene function and character development. In some embodiments, the combination can include scene function and theme. In some embodiments, the combination can include plot/subplot and character development. In some embodiments, the combination can include plot/subplot and theme. In some embodiments, the combination can include character development and theme. In addition to, or in place of, the effects set-forth above, the desired effect can include an emotional effect, an action effect, a video effect, an audio effect, a timing effect, or a combination of effects, for example.

The desired effect can include any one, or any combination of what is referred to as "the 12 dramatic elements". The 12 dramatic elements are contrast, conflict, climax, timing, tension, rhythm, mood, language, sound, physical space, visual symbol, and focus of concentration and engagement; and, focus, space, tension and timing are dramatic elements that are essential to every performance. Of the 12 dramatic elements, 4 include some element of timing and rhythm, and they are timing, tension, rhythm, and mood. It should be appreciated that the computerized systems and methods provided herein overcome variations in timing and/or rhythm between random acting tracks, and this is currently lacking in the art of acting. As can be seen, integrating actors remotely into an ensemble of actors, where each actor creates an acting track on his/her own, requires a tool for integrating the performances despite their variations in at least timing and rhythm.

The following examples illustrate how a script can be divided into timing segments and assigned pace-setters for the assembly of an ensemble of remotely performed performances by each of the actors in the ensemble.

Example 1. Dividing an Act within a Script into Scene Sequences, Beats, and Timing Segments, and Assigning Pace-Setters This example shows how a script may be divided into a plurality of pace-setting performances, or segments ("timing segments") for use with the methods and systems taught herein. Each pace-setting performance will serve as a timing element for each of the other performances that are designed to occur in the same time-frame as the pace-setting performance. The dividing of the script can be done, for example, by a screenwriter, director, administrator, producer, or anyone else selected to, and/or qualified to, divide the script.

One of skill will appreciate that a "script" or "screenplay" has an anatomy to it's structure, telling a story through a series of desired effects that are presented in one or more "acts", each telling a part of the story. The acts can be divided into "subacts", as desired, and acts or subacts can be divided further into "scenes". In turn, scenes can be divided into "beats" that can be assembled as a scene sequence assembled to provide the desired effects of the scene. The acts, subacts, scenes, and beats are each a structural feature of the anatomy of the script/screenplay. The "desired effect" can be any effect known to the skilled screenwriter. For example, the desired effect can include scene function, plot/subplot, character development, theme, or some combination of these desired effects. In some embodiments, the combination can include function and plot/subplot. In some embodiments, the combination can include function and character development. In some embodiments, the combination can include function and theme. In some embodiments, the combination can include plot/subplot and character development. In some embodiments, the combination can include plot/subplot and theme. In some embodiments, the combination can include character development and theme.

It should be appreciated that a script can be divided into a one or more segments as follows: The segments can be acts, for example, and acts can be divided into one or more subacts. Acts or subacts can be divided into one or more scenes. Likewise, scenes can be divided into scene sequences. And, scenes or scene sequences can be divided into one or more beats. For example, the anatomy of a script can be, perhaps, a screenplay having 4 acts of 30 pages each; each act can have 3, 10 page subacts; each subact can have 3 scenes or scene sequences; and, each scene or scene sequence can have 3 beats, the beat being the smallest unit of any scene. As such, a "segment" can be an act or acts, a subact or subacts, a scene or scene sequence, where the scene or scene sequence can include a beat or beats. As such, and likewise, a segment can also be a beat or beats.

For the methods and systems provided herein, the screenwriter can divide the script into pace-setting performances by segments of the script. As such, the segments can be divided by act or acts, subact or subacts, scene or scene sequences, beat or beats, or any combination thereof. Since the pace-setting performance controls the timing of all performances in a respective segment, the script is divided into segments that provide structure and character development throughout the entirety of the script. The screenwriter can consider the big picture effect, and microcosmic contributions, that each performance contributes to the script when assigning pace-setting performances to segments throughout a script.

FIG. 6 illustrates a script table that divides an act, which is a portion of a script defined by a set of scene sequences, each scene sequence defined by duration and location and divided into beats of defined durations and locations, according to some embodiments. In FIG. 6, a script divided into a plurality of pace-setting performances, a pace-setter is assigned to each beat, and the pace-setter of each beat is shown framed in bold italics and listed in it's respective beat. The timing segment borders that frame each pace-setter are shown in bold vertical lines below the respective beat in the script table. The act uses actors Jenny, Michael, Charles, Lentil, Johnson, Caretaker, Nancy, Johnson, and Stan. There are 7 background actors that are used throughout the act:

BGA1: background actor 1 in Astroidia Lab, few lines, character development of Jenny and Michael;

BGA2: background actor 2 in Astroidia Lab, few lines with BGA1;

BGA3: background actor 3 in Astroidia Lab, no lines, visual effect for Lab only; BGA4: background actor 4 on Titanic Bridge, few lines, character development of Stan and Johnson;

BGA5: background actor 5 on Titanic Bridge, few lines with BGA4, visual effect for Bridge;

BGA6: background actor 6 on Titanic Bridge, no lines, visual effect for Bridge only; and, BGA7: background actor 7 on Titanic Bridge, no lines, visual effect for Bridge only.

The screenwriter may breakdown the portion of the script as follows:

Scene Sequence 1 (14 minutes)

Beat 1: In her lab at Space Station Astroidia, Doctor Jenny and her son, Michael, are discussing their work, when the starship Blaster contacts them. Jenny is assigned to be the pace-setter, leading the desired effect in this beat.

Beat 2: Captain Charles, whose mind is now controlled by Demon, informs Jenny that the planet upon which the Morphosis device was to be potentially tested checks out, and that the scientific team should get ready for the starship Blaster's arrival, which will move all of the project's materials to the planet for testing. Charles is assigned to be the pace-setter, leading the desired effect in this beat.

Beat 3: Jenny is furious, as the device was not supposed to be tested for another three months. Charles tells her that the orders came from Admiral Robert C. Johnson himself.

Jenny is assigned to be the pace-setter, leading the desired effect in this beat.

Scene function: this is a long scene with three beats, and the scene functions as the first subact of this part of the script.

Scene plot/subplot: provide pure information, setting up the events for the rest of this act.

Segments: Beats 1, 2, and 3 are each a segment of their own, the pace changing from the acting styles of Jenny to Charles to Jenny in Scene Sequence 1.

Scene Sequence 2 (6 Minutes)

Beat 1: On the starship Titanic, Lieutenant Lentil catches Johnson at a turbolift. As they ride together, there is an uneasy tension and attraction between them, and Johnson comments that she changed her hair. Lentil stops the lift, and talks to Johnson about her performance during the ambush test (in Act I, the film's opening sequence). She asks him how he passed the test, and Johnson gives a coy non-answer. Johnson resumes the lift; it stops, Caretaker gets on, Lentil exits.

Lentil is assigned to be the pace-setter, leading the desired effect in this beat.

Beat 2: On the lift, after brief dialogue with Caretaker, Johnson is contacted by Nancy via the comm system, and she tells them that Jenny is urgently trying to contact him. Johnson tells Nancy he'll take the message in his quarters, and he stops the lift and gets out. Caretaker makes a joke about Johnson's skill with women ("It never rains but it pours," referring to both Lentil and Jenny) and Johnson lightly chastises him.

Johnson is assigned to be the pace-setter, leading the desired effect in this beat.

Beat 3: Jenny's transmission is garbled, unstable. She demands to know why Johnson is taking Morphosis away from her, but she can't hear his response. She insists he do something, then her transmission is cut off. Johnson tells Nancy to alert Command Center.

Johnson is assigned to be the pace-setter, leading the desired effect in this beat.

Scene function: this is composed of three moments that function like a complete second subact, thus it's a scene sequence.

Scene plot/subplot: the main characters must react to unfolding events. Introduction of Johnson/Jenny subplot and hints about their past association.

Character development: development for Lentil, Johnson, and Caretaker.

Theme: Lentil's discussion with Johnson brings up one of the script's main character themes, which is that of Johnson's propensity to never play by the rules in order to beat impossible odds.

Segments: Beat 1 is a segment of it's own with Lentil setting the pace, but Beats 2 and 3 are combined to serve as a single segment with Johnson setting the pace. This is an example of how 2 of 3 beats can serve as a single segment to obtain the desired effect by leaving the pace-setting role in Johnson in Scene Sequence 2.

Scene Sequence 3 (10 Minutes)

Beat 1: Back on Astroidia, Jenny and her son Michael argue about the intentions of Command Center, which Michael suggests are militaristic.

Michael is assigned to be the pace-setter, leading the desired effect in this beat.

Beat 2: On the Titanic, Johnson tells Captain Stan that Command Center has ordered them to investigate, even though the ship is on a training mission and filled with cadets. Stan, the Titanic's current captain, urges Johnson to take command of the ship, and reminds him that "... death can be glorious in the pursuit of life, liberty, and happiness," and Johnson responds, "or necessary."

Stan is assigned to be the pace-setter, leading the desired effect in this beat.

Beat 3: Johnson takes command of the Titanic, and orders a course set for Astroidia. Johnson is assigned to be the pace-setter, leading the desired effect in this beat.

Scene function: the scene sequence ends in the climax of the act.

Scene plot/subplot: the main characters make the commitment to act upon the events, and set out on their journey.

Character development: Shows Michael's suspicion of Command Center (which later translates as immediate distrust of Johnson, secretly his father). Develops Stan's character, and the relationship between Johnson and Stan.

Theme: Stan's dialogue with Johnson introduces a major theme, which is that of personal sacrifice to save others.

Segments: Beats 1, 2, and 3 are each a segment of their own, the pace changing from the acting styles of Michael to Stan to Johnson in Scene Sequence 3.

As can be seen from FIG. 6, the method includes assigning any of several characters a pace-setter role, the assignment including identifying an effect or effects desired, and choosing pace-setter roles to achieve the effect or effects desired. In some embodiments, the pace-setter is selected to best provide the desired effect in a given segment, and a collection of pace-setters is assigned to a collection of segments to achieve a desired overall effect. The pace-setter can be a lead actor, a supporting actor, a background actor, a complementary event or series of events, and the like. In addition to, or in place of, the effects set-forth above, the desired effect can include an emotional effect, an action effect, a video effect, an audio effect, a timing effect, or a combination of effects, for example. In any event, the pace-setter establishes the timing of a segment of a script that all other performances, complementary events or series of events, that occur during that segment must also follow to keep the pace of the timing segment. In order to align, or synchronize, each performance to the others, the pace-setting performance serves as a timing reference for each of the other performances that are designed to occur in the same time-frame as the pace-setting performance.

The timing segments are framed and define borders, or "timing segment borders" that mark the start and end of the respective timing segments. In some embodiments, each point in time can fall within a timing segment and between timing segment borders. The timing segment borders can be marked with indices, as points in time, as discussed herein, framing each timing segment with indices to mark, or flag, the timing segment borders. As the script transitions from timing segment to timing segment, the pace-setters also transition, as each timing segment is assigned it's own pace-setter which can be the same or different than the prior, or subsequent, pace-setter.

Each of the pace-setters have their own block of time within their respective timing segment. The duration of the block of time for the pace-setter can be equal to, or less than, the duration of the block of time for the timing segment. However, the duration of each of the pace-setters encompass each of the other performances or complementary events, in the respective timing segment, in some embodiments. The block of time for the pace-setter can also be identified and marked with indices to define the borders of the pace-setters within their respective timing segments. The term "segment", "acting segment", and "timing segment" can be used synonymously in some embodiments. The pace is set by the pace-setter in it's respective segment in the manner designed into the script.

The systems and methods transition between pace-setters in the alignment of the ensemble of performances. The transition between pace-setters can be triggered, switched, or indexed, in some embodiments. In some embodiments, the transitions can be triggered, switched, or indexed, by the pace-setting actor, whether manually or automatically, in some embodiments. In some embodiments, however, the control over the onset of a segment can be triggered, switched, or indexed by the director, producer, or another administrator during the production of the ensemble of performances. The terms "triggered", "switched", and "indexed", can be used synonymously in some embodiments.

Example 2. The Mechanics of Assigning and Assembling a Timing Segment, a Pace-Setter, and a Plurality of Performances The systems and methods for aligning and assembling an acting performance with a complementary series of events include configuring a script, or a portion of a script, with timing segments, pace-setters, and aligning a performance and a complementary event or series of events by timing segment and pace-setter. Indices can be used as fixed positions or adjustable positions, in some embodiments.

Figure 7:
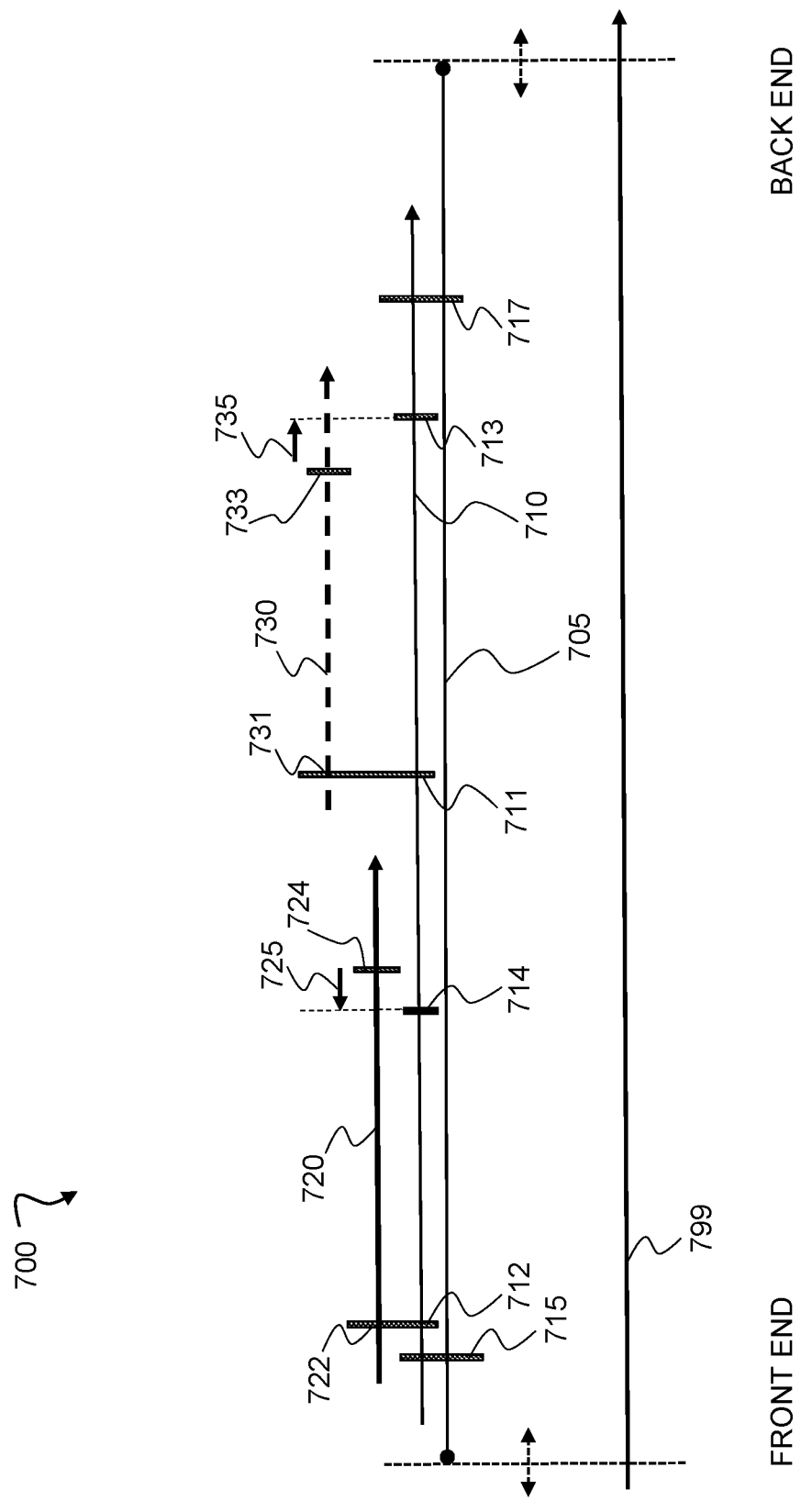
FIG. 7 illustrates the mechanics of the relationships between a timing segment, a pace-setter, and two remote performances, according to some embodiments.

FIG. 7 illustrates the mechanics of the relationships between a timing segment, a pace-setter, and two remote performances, according to some embodiments. The method includes assigning a timing segment 705 to a script, or a portion of a script (not shown), to contain the remotely recorded performance and the complementary series of events, the timing segment 705 configured being a portion of a timeline 799 for the script. The timing segment 705 is a unit of time used to align the location and duration of the data files placed on the timeline 799 in the assembling. And, the timing segment can be configured and defined by assigning and placing indices on the timeline 799 of the script.

The method further includes assigning a digital pace-setter 710, also referred to as merely a pace-setter, to the timing segment 705. The digital pace-setter 710 can have a fixed position and fixed duration on the timeline 799. Indices can be used to fix the position of the pace-setter 710 on the timeline 799, and within it's respective timing segment 705. The duration of time of the pace-setter 710 can be equal to, or less than, the duration of time of the timing segment 705. The fixed position can be selected to express a desired effect from the acting performances in the timing segment, and the fixed duration can be configured to contain the remotely recorded performance and the complementary series of events. In these embodiments, the pace-setter 710 can be selected from the group consisting of a pace-setting performance, a pace-setting visual event, a pace-setting audio event, a pace-setting scripted time-frame, and a pace-setting subjective time frame. And, in some embodiments, the start of the digital pace-setter 710 is bounded on the timeline 799 by a fixed start tag index 715, and the stop of the digital pace-setter 710 is bounded by a fixed stop tag index 717. In these embodiments, the duration of the pace-setter 710 does not exceed the duration of the timing segment 705.

The next step includes calibrating the digital pace-setter 710 to the acting performances 720,730 to align the acting performances 720,730 for the assembly. In this example, one acting performance 720 is referred to as "remotely recorded performance", and the other acting performance 730 is referred to as "complementary series of events".

The calibrating includes assigning a start pacing index 712 on the digital pace setter 710 that correlates with a start pacing index 722 on the remotely recorded performance 720; and, assigning a stop pacing index 714 on the digital pace setter 710 that correlates with a stop pacing index 724 on the remotely recorded performance 720 within the timing segment 705. The calibrating further includes assigning a start pacing index 711 on the digital pace setter 710 that correlates with a start pacing index 731 on the complementary series of events 730; and, assigning a stop pacing index 713 on the digital pace setter 710 that correlates with a stop pacing index 733 on the complementary series of events 730 within the timing segment 705.

The calibrating further includes aligning the remotely recorded performance 720 with the digital pace-setter 710, the aligning including fixing the position of the start pacing index 722 of the remotely recorded performance 720 at the correlating start pacing index 712 on the digital pace-setter 710, measuring the distance on the timeline 799 between the position of the stop pacing index 724 of the remotely recorded performance 720 and the position of the correlating stop pacing index 714 on the digital pace-setter 710; and, when the distance exceeds tolerable limits, moving 725 the stop pacing index 724 on the remotely recorded performance 720 to align with the position of the correlating stop pacing index 714 of the digital pace-setter 710.

The calibrating further includes aligning the complementary series of events 730 with the digital pace-setter 710, the aligning including fixing the position of the start pacing index 731 of the complementary series of events 730 at the correlating start pacing index 711 on the digital pace-setter 710, measuring the distance on the timeline 799 between the position of the stop pacing index 733 of the complementary series of events 730 and the position of the correlating stop pacing index 713 on the digital pace-setter 710; and, when the distance exceeds tolerable limits, moving the stop pacing index 733 on the complementary series of events 730 to align with the position of the stop pacing index 713 of the digital pace-setter 710.

The tolerable limits vary between performances and scripts, and they can be a default time limit or a time limit that can be adjusted by the director, screenwriter, administrator, or anyone having a desire or purpose in adjusting the tolerable limits. In some embodiments, the tolerable limit can be 0.01 second, 0.1 second, 0.2 seconds, 0.3 seconds, 0.4 seconds, 0.5 seconds, 0.6 seconds, 0.7 seconds, 0.8 seconds, 0.9 seconds, 1.0 second, 1.1 seconds, 1.2 seconds, 1.3 seconds, 1.4 seconds, 1.5 seconds, 1.6 seconds, 1.7 seconds, 1.8 seconds, 1.9 seconds, 2.0 seconds, 3.0 seconds, 4.0 seconds, 5.0 seconds, or any amount or range therein in increments of 0.01 seconds.

This example shows how the pace-setter 710 can be fixed on the timeline 799 within the timing segment 705 at the front end and the back end of the pace-setter 710, the remotely recorded performance 720 and the complementary series of events 730 are fixed at their front ends and adjusted at their back ends to align with the pace-setter 710 and each other in the calibrating during the assembly. It should be appreciated that the pace-setter 710 can be shorter in duration than the timing segment 705, and that the pace-setter 710 can be adjustable too, such that the pace-setter 710 can be moved toward the front end or the back end of the timing segment 705, as desired, as a whole to obtain a desired effect and provide further adjustment in the assembly of performances. The pace-setter 710 can also be compressed or expanded to further refine the pace set by the pace-setter 710. Having the ability to adjust the pace-setter 710 by repositioning, compressing, expanding, or a combination thereof, provides a dynamic way to obtain a desired effect from a performance or set of performances. Moreover, it should also be appreciated that the mechanics of the systems and methods allow any of the indices in the system to be adjusted digitally to obtain the desired effect. Moreover, it should be appreciated that the digital material in each of the performances is a package of data that can be assigned, located, compressed, and expanded as desired in the assembly and adjustment of the ensemble of performances to obtain a desired effect. And, in some embodiments, the pace-setter is the primary mechanism for establishing the time in the creation of, and the adjusting for, the desired effect.

Example 3. Expanding or Compressing Previously Recorded Performances to Align with a Pace-Setter In Example 2, the mechanics of assembling performances to align with a pace-setter within a single timing segment are taught. In this example, the alignment is expanded to occur in a single scene sequence, which includes 3 beats. Each of the beats has it's own timing segment and pace setter. As such, this example teaches the expanding or compressing of previously recorded performances to align with a series of pace-setters in a series of timing segments. For purposes of illustration, the configuration of the pace-setters and performances are taken from a scene in Example 1 for continuity in the teaching. It should be appreciated, however, that any type of pace-setter taught herein can be used. Moreover, although the timing segments are divided into beats in this example, beats do not have to be used. The timing segment can be designed in any manner taught herein. Likewise, any method of compressing or expanding digitally recorded performances known to one of skill may also be used, in some embodiments.

Figure 8:
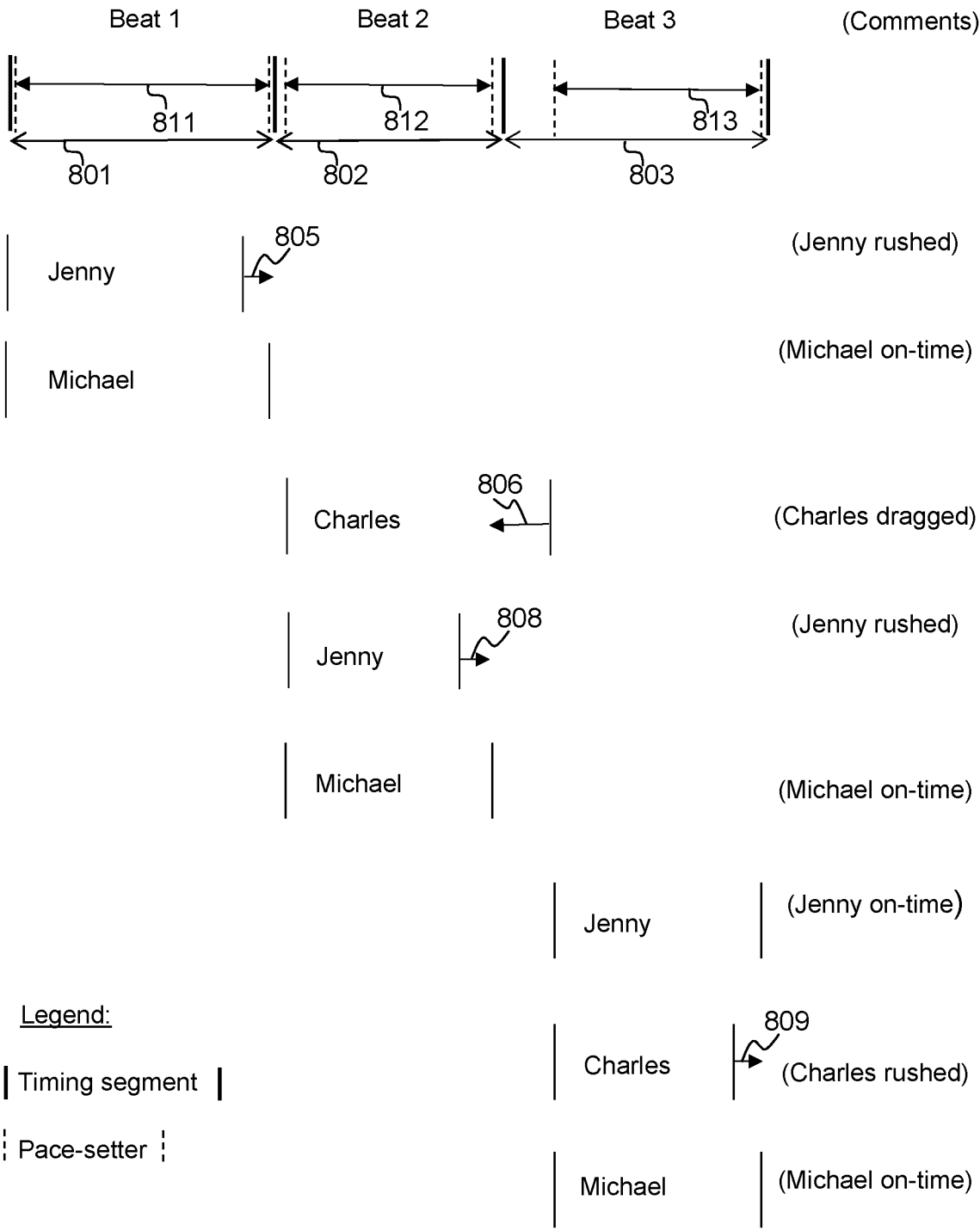
FIG. 8 illustrates a method of using a series of pace-setters, each pace-setter in the series falling within a respective series of timing segments, according to some embodiments.

FIG. 8 illustrates a method of using a series of pace-setters, each pace-setter in the series falling within a respective series of timing segments, according to some embodiments. The construct 800 of FIG. 8 allows us, for example, to align 8 performances from Jenny, Michael, and Charles in a scene sequence having 3 beats, aligning each of the 8 performances to it's respective pace-setter assigned within each of the beats. As such, there are 3 assigned pace-setters and 5 performances that align with it's respective pace-setter within the 3 assigned pace-setters. In the alignment, the systems and methods can be configured to allow us to adjust for rush and drag through the configuration of software instructions that instruct the processor to execute such adjustments in timing to compensate for performers "rushing" a performance a bit faster than desired, or "dragging" a performance a bit slower than desired.

Scene Sequence 1 was configured into 3 beats: Beat 1, Beat 2, and Beat 3. Beat 1 is performed by Jenny and Michael, with 3 background actors BGA1, BGA2, and BGA3, where Jenny is the designated pace-setting actor for the beat. Beat 2 is performed by Charles, Jenny, and Michael, with the 3 background actors BGA1, BGA2, and BGA3, where Charles is the designated pace-setting actor for the beat. Beat 3 is performed by Jenny, Charles, and Michael, with the 3 background actors BGA1, BGA2, and BGA3, where Jenny is again the designated pace-setting actor for the beat. The actor's performances are either on-time, or they suffer varying degrees of rush or drag that can be corrected by the systems and methods taught herein. The background actors are disregarded for purposes of this simple explanation, but the use of the systems and methods to align the background actors to their respective pace-setters would be consistent with these teachings.

The duration of the pace-setter in each beat can be designed by the creator of the script, the director, the producer, or anyone that has been assigned to design the performances for a desired effect. In some embodiments, the duration of the pace-setter can be a default setting which, for example, can be preset by the creator of the script, the director, the producer, or anyone that has been assigned to design the performances for a desired effect. The default setting can be adjusted in some embodiments to help meet the desired effect, or to change the effect desired. As such, the pace-setting actor can target their performance to align with the duration of the designed duration of the pace-setter, in some embodiments.

Whether or not a performance falls within the degree of error to be acceptable depends on the tolerance for acceptance provided by the programming. In some embodiments, the amount of rush or drag falls within a programmed tolerance limit if the rush or drag is 0.1 second, 0.2 second, 0.3 second, 0.4 second, 0.5 second, 0.6 second, 0.7 second, 0.8 second, 0.9 second, 1 second, 2 seconds, 3 seconds, 4 seconds, 5 seconds, or any amount or range therein in increments of 0.1 second.

In Beat 1, Jenny is the pace-setting actor, and the duration of the pace-setter 811 for Beat 1 is designed to be approximately the same as the duration of the timing segment 801 for Beat 1. Here, Jenny rushed 805 her performance a bit, such that she will need to repeat her performance to hit the target duration, or the duration of her performance can be expanded digitally to align with the duration of the pace-setter 811 without requiring a repeated performance. In this case, the rush 805 was minor, and so the duration is likely readily adjustable without too much of an effect on the quality of the playback. The duration of Michael's performance is almost identical to the designed duration of the pace-setter, and so Michael's performance is considered "on-time" and will likely not require any expansion or compression due to being within the tolerance for acceptance. Beat 1 is an example that shows the need to adjust the duration of the performance of the pace-setting actor rather than the performance of a second pre-recorded actor. This is a function that falls within the programming of the systems and methods taught herein, in some embodiments.

Whether or not a performance falls within the degree of error to be adjustable depends on the tolerance for adjustment provided by the programming. In some embodiments, the amount of rush or drag falls within a programmed tolerance limit if the rush or drag is 0.1 second, 0.2 second, 0.3 second, 0.4 second, 0.5 second, 0.6 second, 0.7 second, 0.8 second, 0.9 second, 1 second, 2 seconds, 3 seconds, 4 seconds, 5 seconds, 6 seconds, 7 seconds, 8 seconds, 9 seconds, 10 seconds, or any amount or range therein in increments of 0.1 second.

In Beat 2, Charles is the pace-setting actor, and the duration of the pace-setter 812 is designed to be a bit less than the duration of the timing segment 802 for Beat 2. Here, Charles dragged 806 his performance significantly, such that he will need to repeat his performance to hit the target duration, or the duration of his performance can be expanded digitally to align with the duration of the pace-setter 812 without requiring a repeated performance. In this case, the drag 806 was significant, and so the duration may not be adjustable, because it may not be within the tolerance, and Charles may need to repeat his performance. Jenny again rushed 808 her performance a bit, such that she will need to repeat her performance to hit the target duration, or the duration of her performance can be expanded digitally to align with the duration of the pace-setter without requiring a repeated performance because it is within the programmed tolerance of rush/drag. In this case, the rush 808 was again minor, and the duration is again likely adjustable for Jenny. As in Beat 1, the duration of Michael's performance is almost identical to the designed duration of the pace-setter 812, and so Michael's performance will, once again, likely not require any expansion or compression due to being within the tolerance for acceptance.

In Beat 3, Jenny is again the pace-setting actor 813, and the duration of the pace-setter 813 is designed to be significantly less than the duration of the timing segment 803 for Beat 3. The duration of the pace-setter 813 doesn't start until a significant time has passed in the initial portion of the timing segment 803. Jenny was on-time as the pace-setting actor 813, meeting the designed duration of the pace-setter 813 quite well, requiring no expansion or compression of her performance due to being within the tolerance for acceptance. Interestingly, Charles tried to speed up this time and rushed 809 his performance a bit, such that he will need to repeat his performance to hit the target duration, or the duration of his performance can be expanded digitally to align with the duration of the pace-setter without requiring a repeated performance. In this case, the rush 809 was minor, and so the duration is likely adjustable due to meeting the tolerance for adjustment. As in Beat 1, the duration of Michael's performance is almost identical to the designed duration of the pace-setter 813, and so Michael's performance will, once again, likely not require any expansion or compression due to meeting the tolerance for acceptance.

One of skill will understand that this example illustrates the general premise of expansion and compression of the duration of an actor's performance to align with the duration of the pace-setter. The software can offer the ability to set tolerance limits for acceptance and adjustment, providing additional quality constraints for the performances and the ability of the systems and methods to adjust for downfalls in the performances while obtaining a quality aligned ensemble of performances as an output from the systems and methods.

Example 3. Assembling Previously Recorded Performances with a Remotely Recorded Performance by Aligning to the Remotely Recorded Performance as a Pace-Setter This example uses the discussion of the general premise of expansion and compression of the duration of an actor's performance to align with the duration of the pace-setter.

In this example, the pace-setter is the remotely recorded performance, and the method uses the pace-setter to align the start and stop of the remotely recorded performance with the start and stop of a second recorded performance. The duration of the remotely recorded performance, the second recorded performance, or both, is independently compressed or independently expanded to align with the duration of the pace-setter selected for a timing segment containing the remotely recorded performance and the second recorded performance.

FIGS. 9A-D illustrate the process of creating a remotely recorded performance, adding other prerecorded performances to the remotely recorded performance, and aligning the performances with the duration of a pace-setter which, in this case is a pace-setting actor, according to some embodiments. The script 900 is broken down into timing segments TS1, TS2, TS3, and TS4, and the time is moving in the direction of the arrow, on the timeline 999, at the top of each of FIGS. 9A-9D. Speech recognition 901 can be used in the indexing to construct the script as desired, in some embodiments.

Figure 9A:
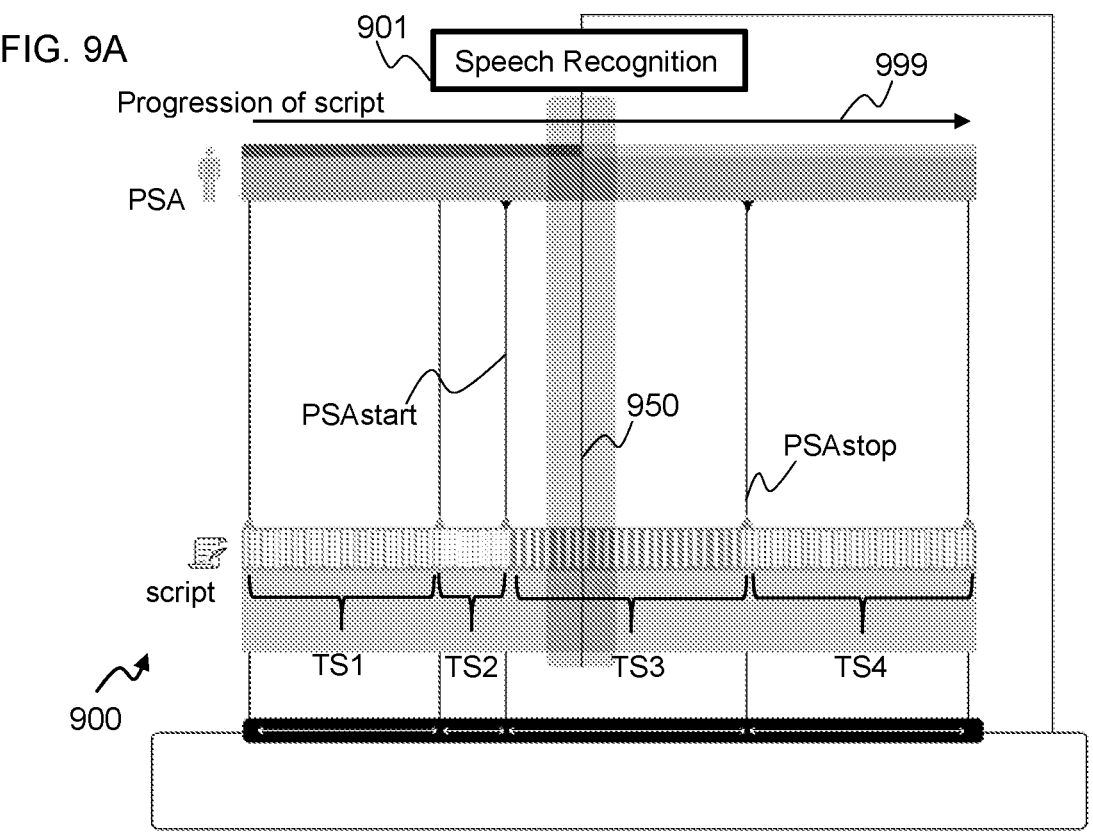

FIG. 9A shows an actor preparing a remotely recorded performance, the actor being the pace-setting actor, PSA, according to some embodiments. The pace-setting actor, PSA, has lines in timing segment 3, TS3, and the actor's placement 950 on the timeline is shown dynamically. For purposes of this example, the duration of the pace-setter, PSA, is assumed to be equal to the duration of the respective timing segment 3, TS3. Since the passage of time for the script 900 moves in the direction of the arrow on the timeline 999 at the top of FIG. 9A, the start of the pace-setting actor's performance is indexed at PSAstart, which is at the transition between timing segment 2, TS2, and timing segment 3, TS3; and, the stop of the pace-setting actor's performance is indexed at PSAstop, which is at the transition between timing segment 3, TS3, and timing segment 4, TS4. The duration of the pace-setting performance, which happens to be equal to the length of TS3 in this embodiment, is used to encompass the start and stop of a second pre-recorded performance of a second actor, which is A2 in FIG. 9B. If the pace-setting actor, PSA, met the expected duration of timing segment 3, no compression or expansion of the performance will be needed. If there was some rush or drag of the performance, it may be corrected through a digital expansion or compression of the performance if the rush or drag falls within the tolerance of adjustment. However, if there was excessive drag of the performance of the pace-setting actor, PSA, beyond the tolerance of adjustment, the performance will need to be repeated to meet the expected duration of timing segment 3, or to at least come close enough to adjust the performance digitally through compression or expansion, as needed to align with other pre-recorded performances.

The system recognizes the pace-setter of a timing segment, and the duration of the pace-setter, using a digital trigger that indicates the onset of the timing segment. The alignment mechanism is initiated through the digital trigger which can have any digital form, including audio data, video data, or perhaps a timing mechanism, each of which may be controlled manually or automatically. In some embodiments, the digital trigger can begin as a default that was designed by the creator of the script. In some embodiments, the digital trigger can be selected at the site of a performance. In some embodiments, the digital trigger can be selected by a producer, director, or any other person seeking to obtain a desired effect from a performance. Any digital form that can be recognized by the systems taught herein can be used as a digital trigger, including a spoken word, an audible sound, an inaudible sound, a physical movement or gesture, a set time, the addition or removal of light, and the like. The transition between TS1, TS2, TS3, and TS4 can, for example, incorporate a digital trigger to indicate the start and stop of the pace-setter to the systems taught herein. In some embodiments, the digital trigger for any transition at any point in the script can be selected to be any digital index provided herein.

Figure 9B:
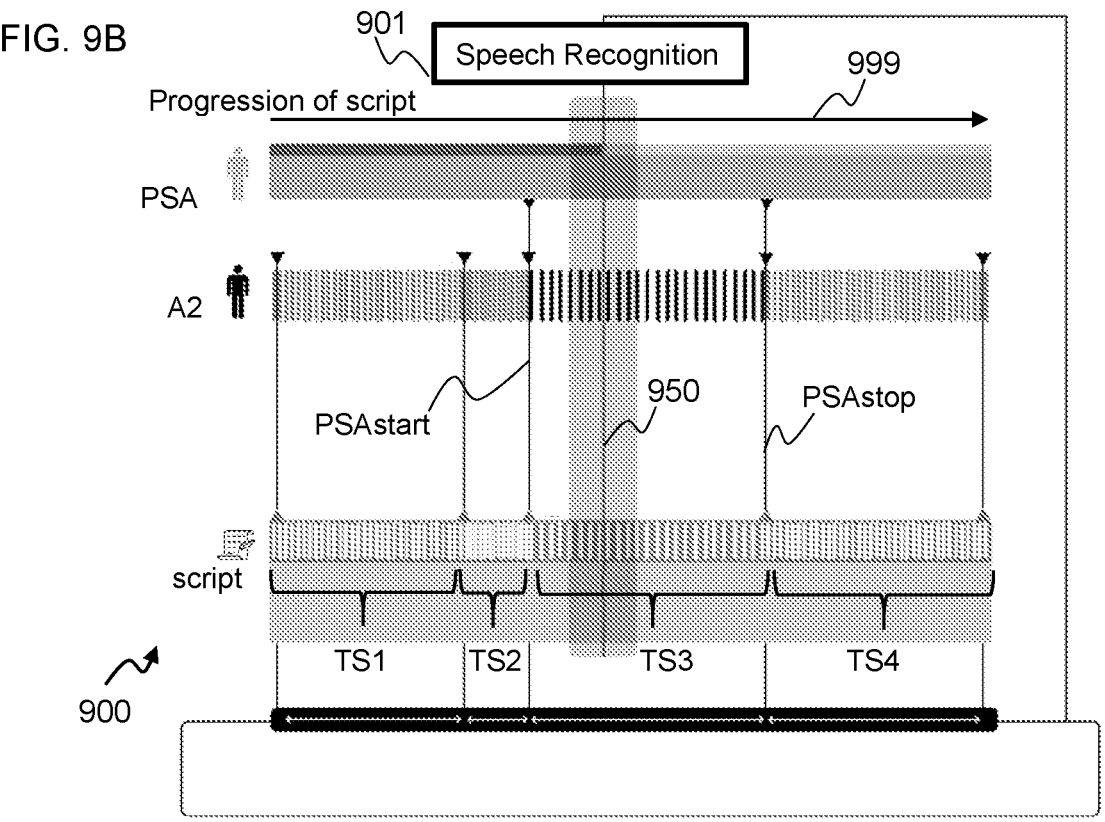

FIG. 9B shows the addition of the second actor, A2, to a remotely recorded performance of the pace-setting actor, PSA, according to some embodiments. In order to follow the pace of the pace-setting actor, PSA, the duration of the performance of the second actor, A2, falls within the duration of time set by the pace setting actor, PSA. If the second actor, A2, met the expected duration of timing segment 3, no compression or expansion of the performance will be needed. If there was some rush or drag of the duration of the performance of the second actor, A2, it may be corrected through a digital expansion or compression of the performance. However, if there was excessive drag of the duration of the performance of the second actor, A2, the performance will need to be repeated to meet the expected duration of timing segment 3, or to at least come close enough to adjust the duration of the performance digitally through compression or expansion, as needed to align with the pace-setting performance, PSA.

FIG. 9C shows the addition of a third actor, A3, to a remotely recorded performance of a pace-setting actor, PSA, the second actor, A2, according to some embodiments. As with the second actor, A2, the duration of the performance of the third actor, A3, falls within the duration of time set by the pace setting actor, PSA. If the third actor, A3, met the expected duration of timing segment 3, no compression or expansion of the duration of the performance will be needed. If there was some rush or drag of the duration of the performance of the third actor, A3, it may be corrected through a digital expansion or compression of the performance. However, if there was excessive drag of the duration of the performance of the third actor, A3, the performance will need to be repeated to meet the expected duration of timing segment 3, or to at least come close enough to adjust the duration of the performance digitally through compression or expansion, as needed to align with the pace-setting performance, PSA.

FIG. 9D shows the addition of a fourth actor, A4, to a remotely recorded performance of a pace-setting actor, PSA, the second actor, A2, and the third actor, A3, according to some embodiments. As with the second actor, A2, and the third actor, A3, the duration of the performance of the fourth actor, A4, falls within the duration of time set by the pace setting actor, PSA. If the fourth actor, A4, met the expected duration of timing segment 3, no compression or expansion of the duration of the performance will be needed. If there was some rush or drag of the performance of the fourth actor, A4, it may be corrected through a digital expansion or compression of the performance. However, if there was excessive drag of the performance of the fourth actor, A4, the performance will need to be repeated to meet the expected duration of timing segment 3, or to at least come close enough to adjust the duration of the performance digitally through compression or expansion, as needed to align with the pace-setting performance, PSA.

Regarding speech recognition 901, it should be appreciated that the spoken voice in the systems and methods taught herein provides a data packaging approach for use in indexing and assembling the ensemble of performances, as well as other functions. For example, the indexing of the timing segments, the pace-setters, and the relative measures of the tolerance of adjustability and the tolerance of acceptance of the performances can be assessed using speech recognition software, sometimes referred to as speech-to-text software (for use in indexing, for example) or text-to-speech software (for use in creating speech from text in the system, e.g., for the reading module). The systems and methods can program the software to identify data packages as whole lines in performances, words, the start points of whole lines, the endpoints of whole lines, the start points of words, the end points of words, a desired time delay before such a data package, a desired time delay after such a data package, and the like. Such functionality can be used by any of the modules or engines taught herein. Examples of voice-recognition software that can be used can include, but is not limited to, PHILIPS SPEECHLIVE (available from Philips, http://www.speechlive.com/us/, downloaded Feb. 7, 2023), DRAGON PROFESSIONAL (available from Nuance, http://www.nuance.com/dragon/business-solutions/dragon-professional-individual.html, downloaded Feb. 7, 2023), GOOGLE CLOUD SPEECH API (available from Google, http://cloud.google.com/speech-to-text, downloaded Feb. 7, 2023), and Microsoft Bing Speech API (available from Microsoft, http://azure.microsoft.com/en-us/products/cognitive-services/speech-services/, downloaded Feb. 7, 2023). Likewise, examples of text-to-speech software that can be used can include, but is not limited to, MURF (available from Murf, https://murf.ai/, downloaded Feb. 7, 2023), speechify (available from Speechify, https://speechiy.com/, downloaded Feb. 7, 2023), SPEECHELO (available from Nooveau Media Ltd, https://speechelo.com/, downloaded Feb. 7, 2023).

This example shows how the performances of 4 actors can be aligned into a single timing segment to follow the pace of a pace-setter assigned to that timing segment. One of skill should appreciate that this is simply repeated for each time segment assigned to a script.

Example 4. Methods of Compressing or Expanding a Performance File

As performances are rushed or dragged and, if they are within the tolerance limits for adjustment, the systems and methods will need to adjust the performances within the tolerance for acceptance. This example provides ways in which the digital performance files may be expanded to address rush and compressed to address drag, in some embodiments.

A performance file can be an audio file, a video file, or an audiovisual file. Performances files can have periods of silences, redundancies in performance features, or may have no redundancies at all in the performances. One of skill will appreciate that there are known methods of expanding and compressing digital files, and that the compression or expansion of the performance files can be done using any method known to one of skill in the art. There are considerations, however, with regard to the methods chosen, and the tolerance limits for adjusting a performance by expansion or compression.

In some embodiments, the compression or expansion can be a stretching or compression of the entirety of the performance without adding or subtracting any portion of the performance file, including data, absences of data, or digital information created in the performance. In some embodiments, the compression or expansion can be a stretching or compression of a portion of the performance without adding or subtracting any digital information from the performance file. In some embodiments, the compression or expansion can be a stretching or compression of the performance by adding or subtracting digital information from the performance file.

Figure 10A:
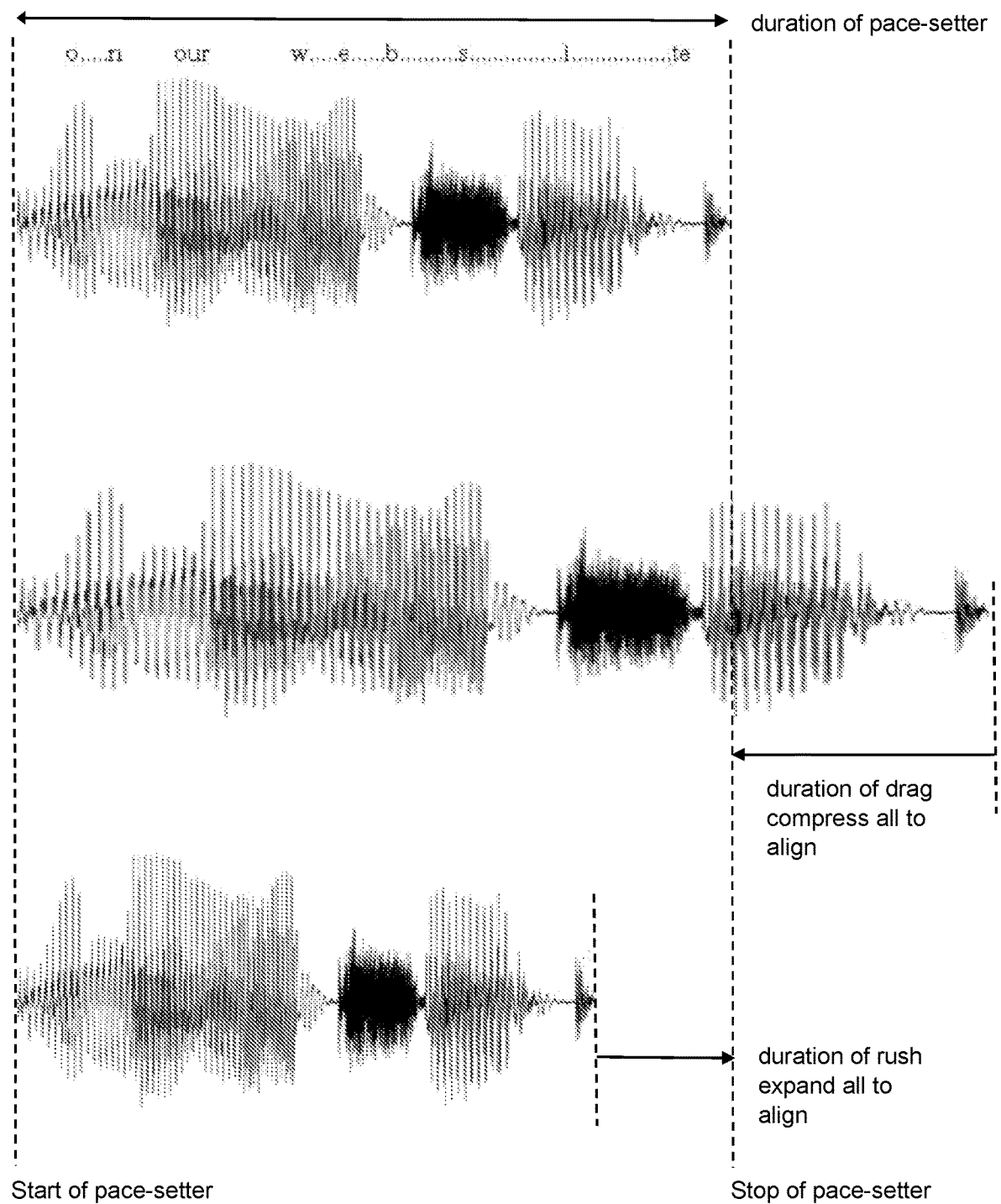
FIGS. 10A-10C illustrate a variety of methods for expanding and compression the performance files, according to some embodiments.
Figure 10B:
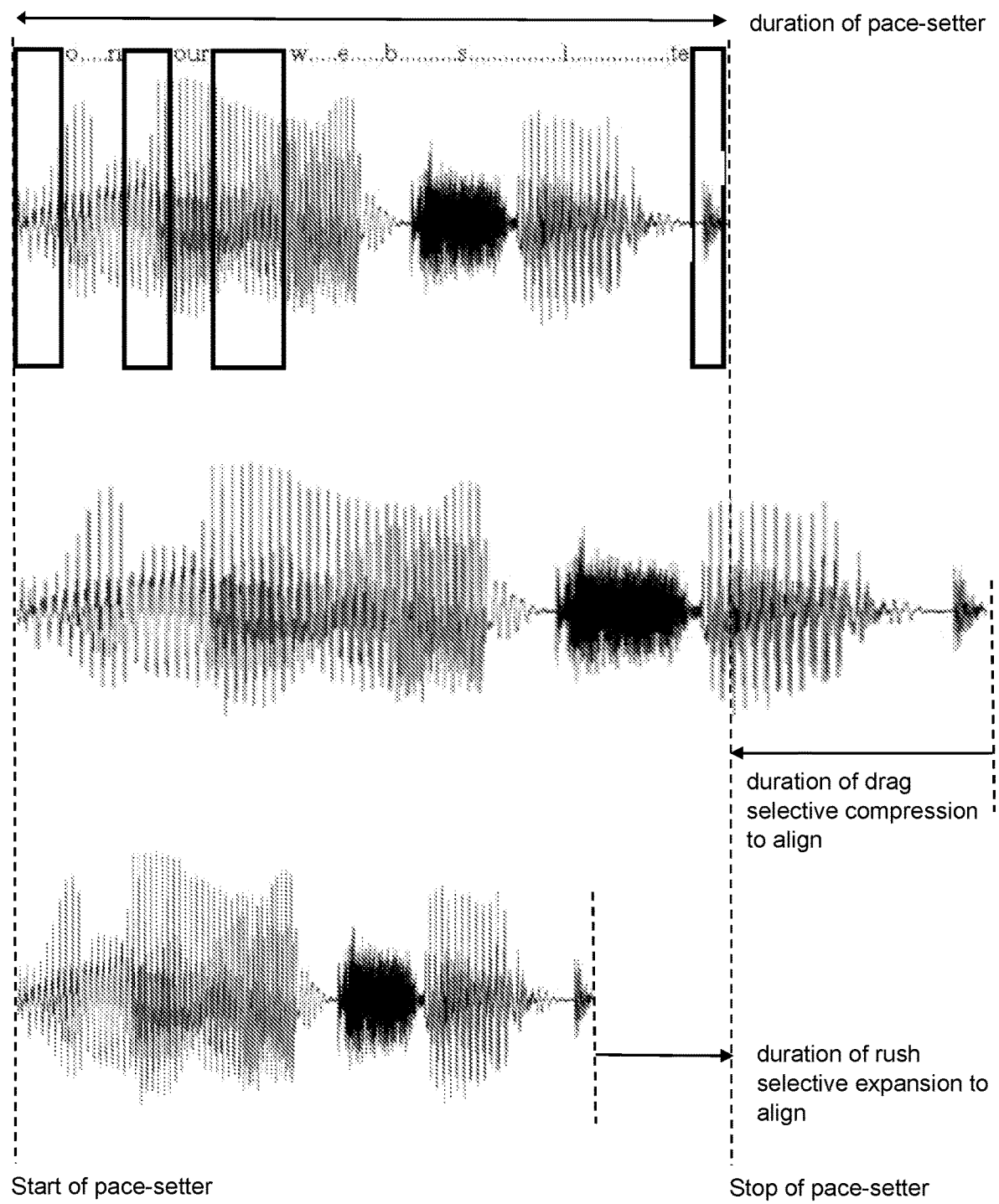
Figure 10C:
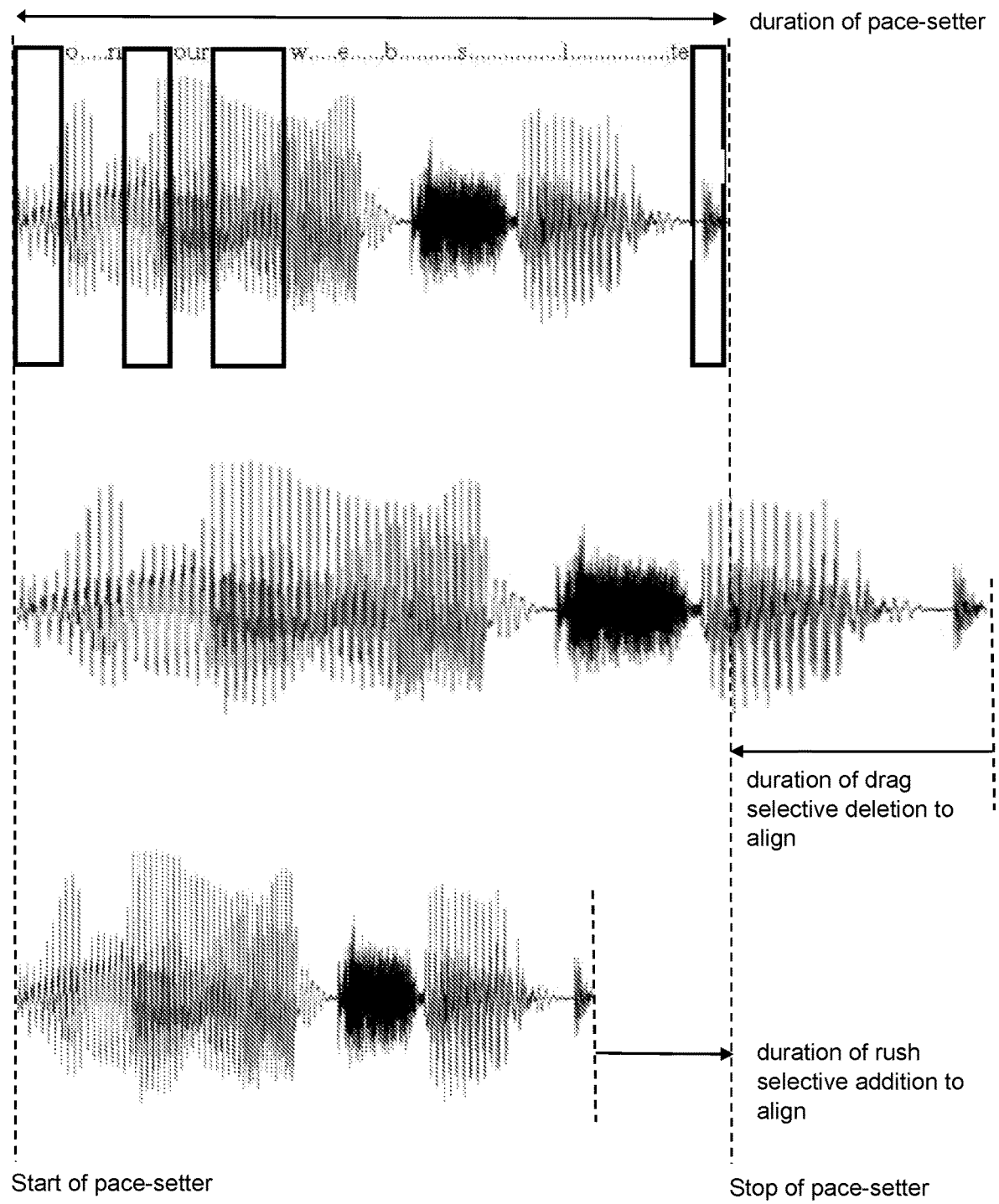

FIGS. 10A-10C illustrate a variety of methods for expanding and compression the performance files, according to some embodiments. FIG. 10A shows the compression or expansion of an audio file as a stretching or compression of the entirety of the performance without adding or subtracting any digital information from the audio file. The waveform at the top fits the duration of the pace setter, the waveform at the bottom illustrates a rushed performance that is shorter than the duration of the pace-setter, and the waveform in the middle is a dragged performance that is longer than the duration of the pace-setter. In this embodiment, all aspects of the file are stretched to align with the duration of the pace-setter. To achieve an overall stretching or compression of the audio file, the start and stop of the waveform are identified, and the data can stretched or compressed to align with the duration of time of the pace-setter. Using this method, it will be understood that such expansion or compression can affect the quality of at least the audio, for example, measurable audio characteristics, such as pitch of a spoken voice, or the like.

FIG. 10B shows the compression or expansion of portions of an audio file as a stretching or compression of a portion of the performance that is void of audible sound. This is done to avoid affecting the quality of at least the audio. The waveform at the top fits the duration of the pace setter, the waveform at the bottom illustrates a rushed performance that is shorter than the duration of the pace-setter, and the waveform in the middle is a dragged performance that is longer than the duration of the pace-setter. In this embodiment, all aspects of the file are stretched to align with the duration of the pace-setter. To achieve an overall stretching or compression of the file, the unaudible portions of the audio are identified, and the data in these portions are stretched or compressed first, to the extent possible, to align with the duration of time of the pace-setter. In FIG. 10B, the unaudible portions are outlined by boxes. If further stretching or compressing is needed, then the audible portions can be stretched or compressed, but it will be understood that such expansion or compression can affect the quality of at least the audio. By limiting the stretching and compression of the audible portions to none, or very little, little-to-no further corrections will be needed to the audio to fine tune measurable audio characteristics, such as pitch of a spoken voice, or the like. The software in the systems and methods provided herein can instruct the processor to achieve this function through an analysis of the performance.

FIG. 10C shows the compression or expansion of portions of an audio file as an addition to, or a deletion of, a portion of the performance that is void of audible sound. The waveform at the top fits the duration of the pace setter, the waveform at the bottom illustrates a rushed performance that is shorter than the duration of the pace-setter, and the waveform in the middle is a dragged performance that is longer than the duration of the pace-setter. In this embodiment, all aspects of the file are stretched to align with the duration of the pace-setter. To achieve an overall stretching or compression of the file, the unaudible portions of the audio are identified, and the data in these portions is either copied and repeated, or deleted, to expand or compress the file to align with the duration of time of the pace-setter. This is another method in which, by limiting the stretching and compression of the audible portions to none, or very little, little-to-no further corrections will be needed to the audio to fine tune measurable audio characteristics, such as pitch of a spoken voice, or the like. The addition of data that is merely a redundancy that will not be noticed, is a valuable way of expanding or compressing the data files, for at least this reason. The software in the systems and methods provided herein can instruct the processor to achieve this function through an analysis of the performance.

It should be appreciated that the same principles can apply to video files, where in some embodiments, the compression or expansion can be a stretching or compression of the entirety of the video data of the performance without adding or subtracting any digital information from the audiovisual file. In some embodiments, the compression or expansion can be a stretching or compression of a portion of the video data of the performance without adding or subtracting any digital information from the audiovisual file. In some embodiments, the compression or expansion can be a stretching or compression of the video data of the performance by adding or subtracting digital information from the video file. Where portions of the video file are stretched, compressed, added, or deleted, appropriate, perhaps redundant, portions of the video file should be identified for that purpose.

Likewise, it should be appreciated that the same principles can apply to audiovisual files, where in some embodiments, the compression or expansion can be a stretching or compression of the entirety of the audiovisual data of the performance without adding or subtracting any digital information from the audiovisual file. In some embodiments, the compression or expansion can be a stretching or compression of a portion of the audiovisual data of the performance without adding or subtracting any digital information from the audiovisual file. In some embodiments, the compression or expansion can be a stretching or compression of the audiovisual data of the performance by adding or subtracting digital information from the audiovisual file. Where portions of the audiovisual file are stretched, compressed, added, or deleted, appropriate, perhaps redundant, portions of the audiovisual file should be identified for that purpose. In audiovisual files, audio data and video data need to both be appropriate for the expansion, compression, addition, or deletion of data.

Given the above, the technologies provided herein include a system for aligning and assembling an acting performance with a complementary series of events. In some embodiments, the systems comprise a processor and, a memory.

Figure 11:
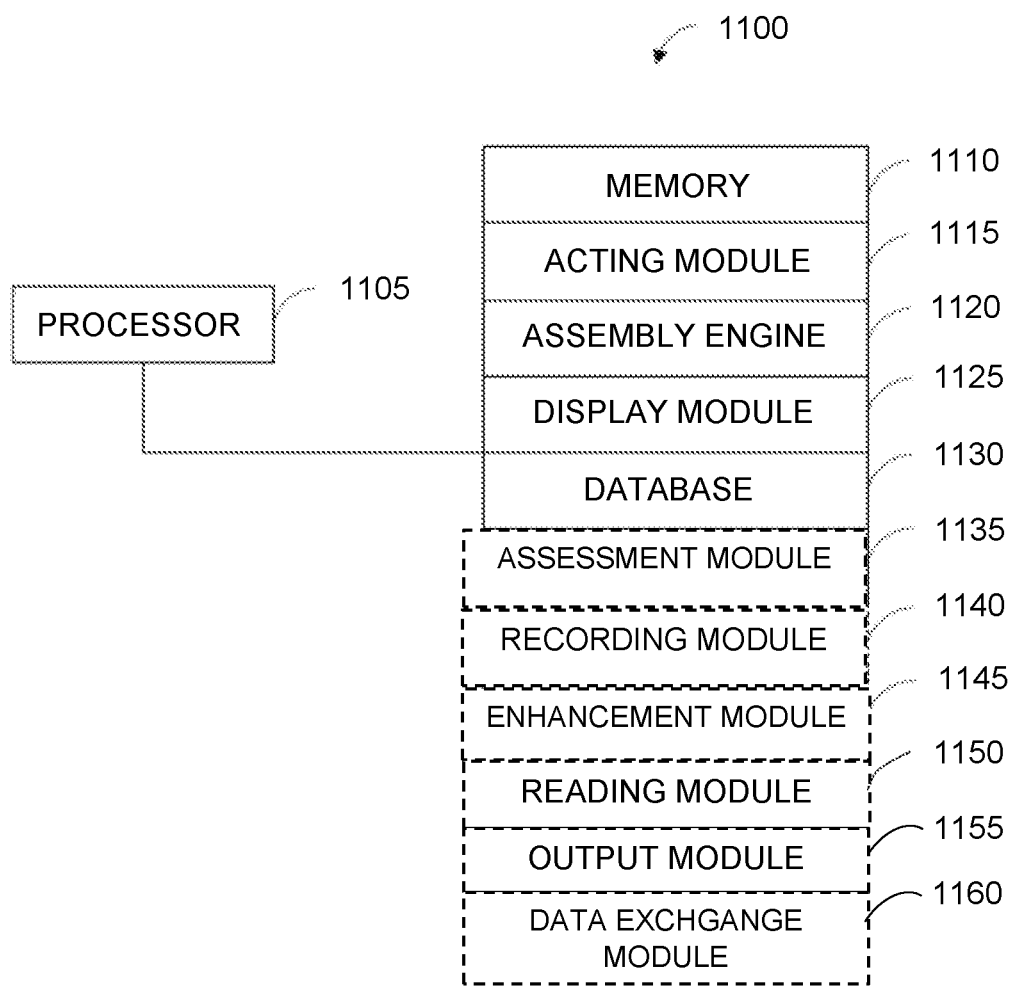
FIG. 11 illustrates a processor-memory diagram to describe components of additional systems taught herein, according to some embodiments.

FIG. 11 illustrates a processor-memory diagram to describe components of additional systems taught herein, according to some embodiments. The system 1100 shown contains a processor 1105 and a memory 1110 (that can include non-volatile memory); wherein, the memory 1110 includes an acting module 1115, which can be called an audition module in some embodiments, operable to interface with a remote actor; an assembly engine 1120, which can be called a meshing engine in some embodiments, operable for assembling, or meshing together, of the performance of a remote actor with a complementary event, such as the performance of a second remote actor; a display module 1125 for displaying the remotely recorded acting performance with the complementary series of events after the assembling by the assembly engine; and, a database 1130 operable for storing system data, including data from a remote actor. Each of the modules and engines provides the processor 1105 with instructions to execute a function. For example, the assembly engine 1120 provides the processor 1105 with instructions used to assemble an ensemble of performances, in some embodiments. And, the display module can be used to display any desired image, video, or text, including the performance of a remote actor, a display of analysis parameters from the analysis module, and the like.

The system can further include an assessment module 1135 on a non-transitory computer readable medium and operable to receive alignment information from the assembly engine to provide an assessment of the remotely recorded performance. In some embodiments, the assessment module 1135 can be referred to as an analysis module, and can be operable to measure voice inflection to provide an assessment of the remotely recorded performance. In some embodiments, the system can be operable for calculating a performance rating based on measurable acting parameters selected from the group consisting of timing, pace, voice volume, voice inflection, and consistency. In some embodiments, the assessment module can be operable for providing a real-time streaming of the acting performance for a real-time review by a casting director, a screenwriter, a producer, or other administrator.

FIGS. 12A-12D illustrate a point-to-point guidance system used by actors and administrators for guidance on alignment of a performance at points in time, and used by actors, directors, and administrators, according to some embodiments. This allows for an analysis of a performance at any point in time, and can be used on a pre-recorded performance or dynamically, real-time. The system 1200 is a part of the screening module, or assessment module, and can be displayed through the output module and/or display module. The guidance systems compare the range of volumes performed, $V_P$, by an actor to the range of volumes targeted by the actor, $V_T$, within a select time-frame. Likewise, the system 1200 compares the timing of the volumes performed, $T_{VP}$, by an actor to the timing of the volumes targeted by the actor, $T_{VT}$, within a select time-frame 1210. The differences between the volumes performed and the volumes targeted, and the differences between the timing of the performed volumes and the timing of the targeted volumes, provide a performance measure, PM, for the actor and the administrator to follow in performing and/or reviewing the performance by the actor. The scale 1220 provides a qualitative display for use by the actor and/or the administrator used in the comparison. If the performance by the actor is "in the pocket" 1230, it can be considered to have differences in volumes and timing with the selected time-frame 1210 that are acceptable. The performance can be considered, qualitatively and/or quantitatively, as having the desired "feel" or "expression" and being "in the pocket", for example.

Figure 12A:
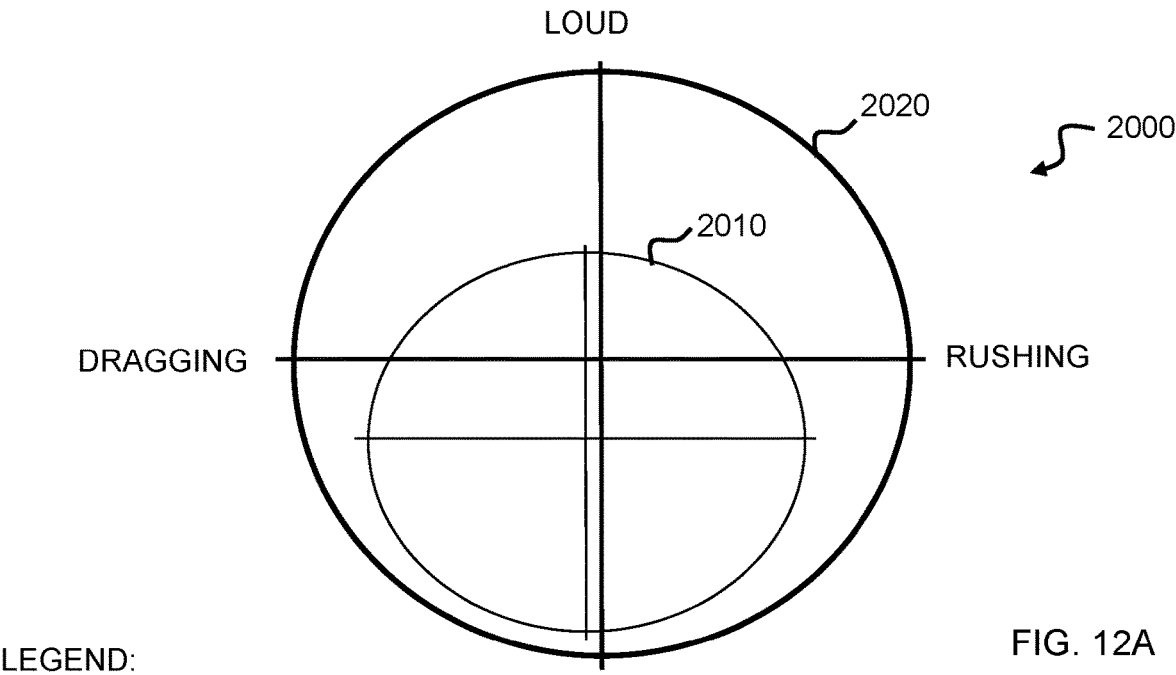
FIGS. 12A-12D illustrate a point-to-point guidance system used by actors and administrators for guidance on alignment of a performance at points in time, and used by actors, directors, and administrators, according to some embodiments.
Figure 12B:
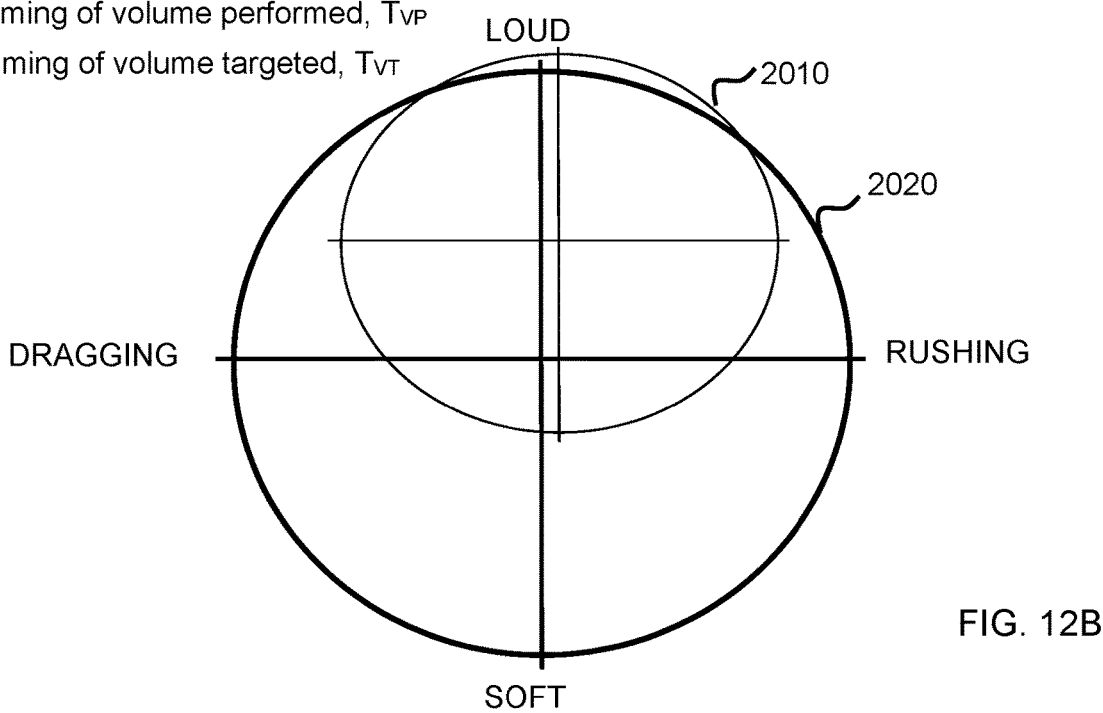
Figure 12C:
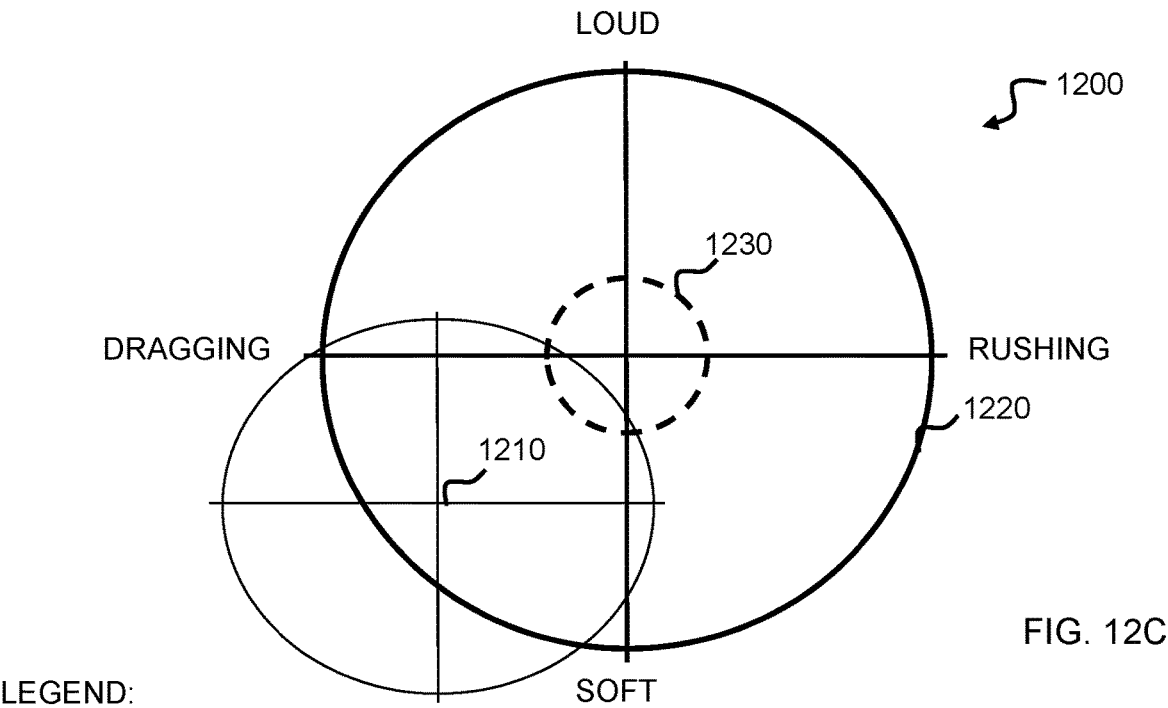
Figure 12D:
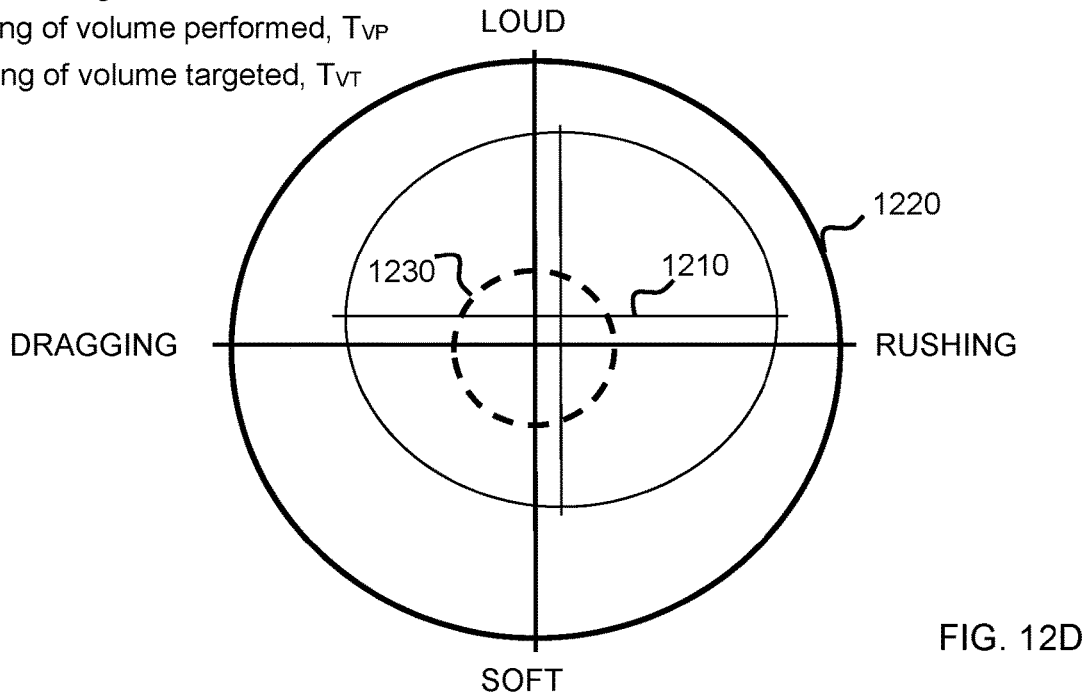

FIG. 12A illustrates an average of volumes over the selected time-frame 1210 being slightly loud in average volume, and performed slightly slow, dragging. FIG. 20B illustrates an average of volumes over the selected time-frame 1210 being slightly soft in average frequency, and performed slightly fast, rushing. FIG. 12C illustrates an average of volumes over the selected time-frame 1210 being quite soft in average volume, and performed slightly slow, dragging. FIG. 12D illustrates an average of volumes over the selected time-frame 1210 being quite loud in average volume, and performed slightly fast, rushing. The selected time-frame can be adjusted to provide a desired degree of resolution during a performance. In some embodiments, the selected time frame can include volume and/or timing comparisons over the entire performance. In some embodiments, the selected time-frame can represent volume and/or timing comparisons in an interval ranging from 0.1 second to 1 minute, from 0.1 second to 50 seconds, from 0.1 second to 40 seconds, from 0.1 second to 30 seconds, from 0.1 second to 20 seconds, from 0.1 second to 10 seconds, from 0.1 second to 5 seconds, from 0.5 seconds to 30 seconds, or any range or 0.1 second therein. In some embodiments, the selected time-frame can represent volume and/or timing comparisons in an interval ranging can represent 0.1 second, 1 second, 2 seconds, 3 seconds, 5 seconds, 10 seconds, 15 seconds, 20 seconds, 30 seconds, or any range therein in increments of 0.1 second.

Figure 13:
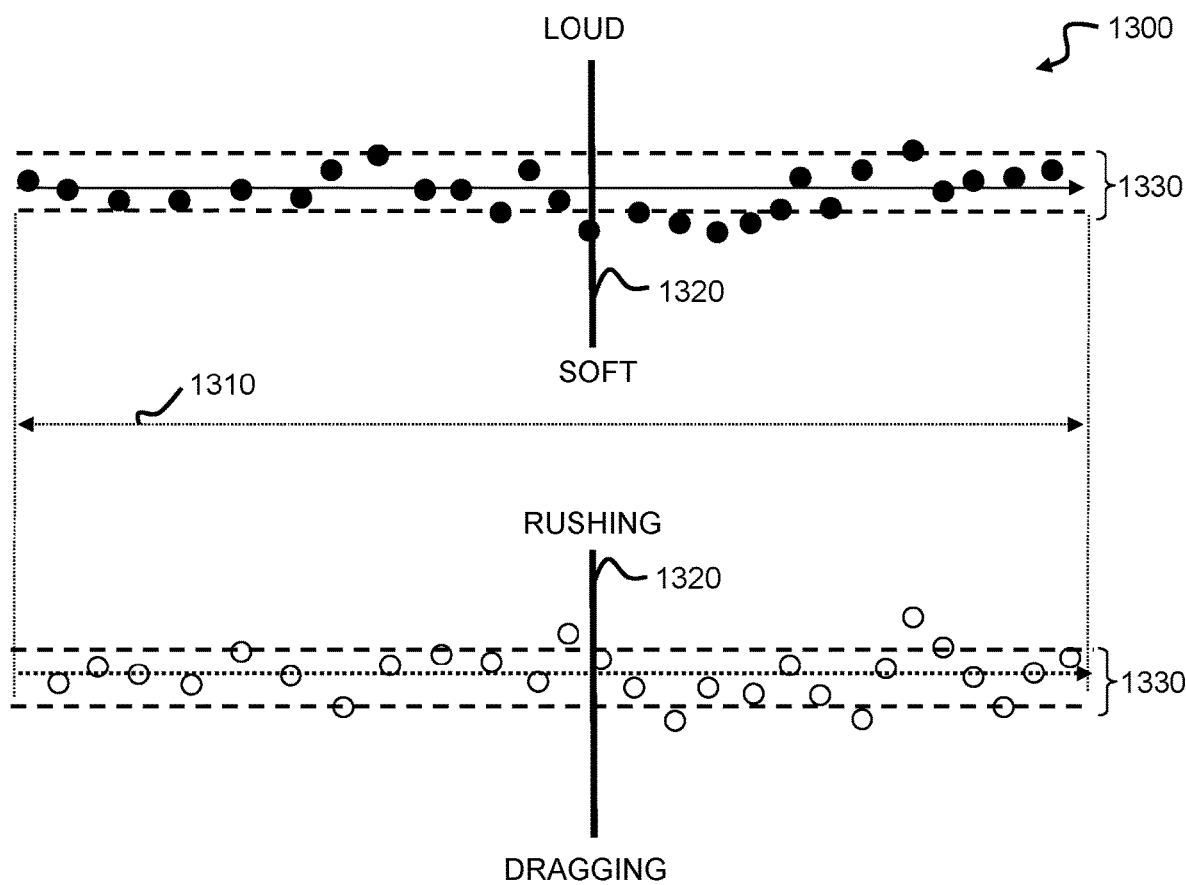
FIG. 13 illustrates an alternative guidance system for alignment of a performance over a span of time, and used by actors, directors, and administrators, according to some embodiments.

FIG. 13 illustrates an alternative guidance system for alignment of a performance over a span of time, and used by actors, directors, and administrators, according to some embodiments. Where the guidance systems in FIG. 12 are directed to guidance at a point in time, FIG. 13 illustrates guidance over a section, or span, of time. The guidance can be used on a pre-recorded performance or dynamically, real-time. This allows for an analysis of a performance over that span of time. The system 1300 compares the volumes performed, $V_P$, by an actor to the volumes targeted by the actor, $V_T$, within a select time-frame. Likewise, the system 1300 compares the timing of the volumes performed, $V_{FP}$, by an actor to the timing of the volumes targeted by the actor, $T_{VT}$, within a select time-frame 1310. The differences between the volumes performed and the volumes targeted, and the differences between the timing of the performed volumes and the timing of the targeted volumes, provide a performance measure, PM, for the actor and the administrator to follow in performing and/or reviewing the performance by the actor. The scale 1320 provides a qualitative display for use by the actor and/or the administrator used in the comparison. If the performance by the actor is "in the pocket" 1330, it can be considered to have differences in volumes and timing with the selected time-frame 1310 that are acceptable. The performance can be considered, qualitatively and/or quantitatively, as having the desired "feel" or "expression", for example, and being "in the pocket".

The qualitative comparison can be made using the relative positions of the visual "cross-hairs" of the performed and targeted volumes and timing of the volumes. A quantitative comparison can be made using the summation of the absolute values of the differences between the performed and targeted volumes and timing of the volumes across the selected time-frame. A mathematical relationship can be used, for example:

(i) for a performance measure of the timing=$PM_T=\Sigma|T_{VP}-T_{VT}|$ and $\Sigma$ is taken for the timing of the performance of each volume across the selected time-frame; and, (ii) for a performance measure of the volume=$PM_F=\Sigma|F_P-F_T|$ and $\Sigma$ is taken for the performance of frequency across the selected time-frame.

These qualitative and quantitative measures can be used alone, or in combination with, a system of voting. The system of voting can be achieved through the votes of one or more administrators, such as one or more directors, actors in the plurality of actors, other users in the network, or the general public, for example. In fact, in some embodiments, the voting system alone can be used and can be implemented with or without the computer network.

The system can further comprise a recording module 1140 on a non-transitory computer readable medium and operable to record the remotely recorded performance. Although the recording can be done through the acting module 1115 in some embodiments, the inclusion of the recording module 1140 can add flexibility and features to the recording of a performance. In some embodiments, for example, the recording module 1140 includes a karaoke screen feature, such as the line display in FIG. 2, for the actor to follow his lines in the script on a video display, for example, the display provided in FIG. 2. In some embodiments, the karaoke screen feature displays the actors lines, and the lines of the other actors in the ensemble of performances. In some embodiments, the karaoke screen feature displays only the lines of the other actors in the ensemble of performances. In some embodiments, the recording module provides a split-screen feature to display both the lines of the actor on one portion of the screen, and the lines of the other actors in the ensemble in another portion of the screen, the portions split graphically using a split-streaming feature in the recording module 1140 that instructs the processor 1105 to execute the split-screen display function. In some embodiments, the recording module 1140 provides a visual display of a timing segment, along with a visual display of the pace-setter, such as, for example, the display in FIGS. 9A-9D. In some embodiments, the recording module provides a visual display of a series of timing segments, along with a display of the respective series of pace-setters. See, for example, FIGS. 9A-9D, which illustrates a single pace-setter among the series of timing segments. In some embodiments, the recording module provides a display of the timeline and the actor's placement on the timeline at any given moment, in addition to one or more of the aforementioned features. In some embodiments, the recording module provides a visual display of a series of timing segments, along with a display of the respective series of pace-setters. In some embodiments, the recording module provides a display of the timeline and the actor's place on the timeline at any given moment, and the position of the other actors that will be placed in the ensemble of performances, in addition to one or more of the aforementioned features. It should be appreciated that, in the recording of a performance, the actor is recording a performance for inclusion in the ensemble, and the only other performance for the system to reference for the actor during the recording may be default performances provided by the system as reference cast members to use as a timing reference, at least in some embodiments.

In some embodiments, the system can further comprise an enhancement module 1145 on a non-transitory computer readable medium, referred to as an editing module in some embodiments, and operable for enhancing audio or video data in the remotely recorded performance to create a desired effect from a performance. In some embodiments, the audio of a performance can be enhanced, wherein the enhancement module can normalize or equalize the gain output of the audio from a performance. Such audio enhancements may be needed, for example, when the microphone used by the remote actor is of poor quality and/or the actor does not speak directly into the microphone. In some embodiments, the video can be enhanced, wherein the enhancement module modifies brightness, contrast, or the like, in order to correct for poor lighting control in a remote environment in which the actor performed. It should be appreciated that any audio or video enhancements can be realized by the actor at the remote location in preparation for an upload of the performance to the system, or by the reviewer of the performance remote from the actor or actors.

Audio can be controlled by the enhancement module, where a threshold can be set, and the audio can be controlled to a level that is commensurate with the set threshold level for the audio. The audio level can be controlled by filtering, or adjusting, the audio input to the system, in some embodiments. In some embodiments, the audio threshold can be either a preset threshold, or an adjusted threshold. The audio threshold can be preset or adjusted to stay in the range of about 70-80 dB, for example. In some embodiments, the audio threshold can be preset or adjusted to stay in the range of about 60-80 dB. And, in some embodiments, the audio threshold can be preset or adjusted to stay in the range of about 65-80 dB. A low audio threshold can be 60 dB, 65 dB, 70 dB, 75 dB, or any amount or range therein in increments of 0.1 dB. A high audio threshold can be 65 dB, 70 dB, 75 dB, 80 dB, or any amount or range therein in increments of 0.1 dB. In some embodiments, an audio threshold can be 60 dB, 61 dB, 62 dB, 63 dB, 64 dB, 65 dB, 66 dB, 67 dB, 68 dB, 69 dB, 70 dB, 71 dB, 72 dB, 73 dB, 74 dB, 75 dB, 76 dB, 77 dB, 78 dB, 79 dB, 80 dB, or any amount or range therein in increments of 0.1 dB.

In some embodiments, the audio level can be controlled by filtering, or adjusting, the audio output from the system. In some embodiments, the enhancement of audio is an audio compression, which is a gain reduction in audio that exceeds the threshold level. The compression is applied either at the input audio or output audio through a digital compressor that can be included in the enhancement module. In some embodiments, the enhancement of audio is an audio expansion, which is an increase in gain in audio that is below the threshold level. The expansion is applied either at the input audio or output audio through a digital expander that can be included in the enhancement module.

In some embodiments, the audio compression is applied as a compression ratio. For example, a ratio of 4:1 means that for every 4 dB the audio exceeds the threshold, the compressor will increase the output by 1 dB, thus compressing the audio 4:1. Likewise, in some embodiments, the audio expansion is applied as an expansion ratio. For example, a ratio of 4:1 means that for every 1 dB the audio is below the threshold, the expander will amplify the output by 4 dB, thus expanding the audio 4:1.

An expander is similar in concept to a compressor, but increases, rather than reduces, the dynamic range above the threshold level. You can use an expander to add liveliness and freshness to your audio signals, for examples. In some embodiments, an extreme form of expander is the noise gate, in which lower signal levels are reduced severely or eliminated altogether. For example, a ratio of 10:1 or higher can be considered a noise gate. Compression/expansion ratios can range from 1:1 where there is no compression, to 20:1 where the audio is nearly blocked from passing the threshold. In compression, the higher the ratio, the more extreme the compression. Likewise, in expansion, the higher the ratio, the more extreme the expansion.

In some embodiments, the compression is 1:1, and applies no compression, where the input and output levels remain the same regardless of the threshold level. In some embodiments, the compression is 1.5:1 and applies subtle compression, the ratio is gentle and transparent sounding, preserving the natural peaks and valleys. In some embodiments, the compression is 2:1 and applies light compression, the ratio smoothly controlling the dynamics without causing noticeable changes to tone and punch. In some embodiments, the compression is 3:1 and applies moderate compression, the ratio slightly more aggressive, applying gentle transient control while retaining natural dynamics. In some embodiments, the compression is 4:1 and applies medium compression, the ratio having tighter control over transients, with subtle changes to tone, punch, and loudness. In some embodiments, the compression is 10:1 and applies heavy compression, an aggressive ratio that dramatically reduces dynamic range, causing audio to lose punch, clarity, and presence if pushed hard. In some embodiments, the compression is 20:1 and is essentially limiting, the compressor essentially blocking the audio from crossing the threshold. The expander can have analogous embodiments with analogous ratios for expansion of the audio.

In some embodiments, the system can further comprise a reading module 1150 on a non-transitory computer readable medium operable for providing a computer reading of an accompanying part in a script to assist in the creation of the remotely recorded performance by providing an assisted reading by text or audio. In some embodiments, the audio can be created through text using the text-to-speech functionalities discussed herein. The reading module can contain reading assistance in the form of text, audio, or audiovisual assistance. Where there is audio only, the audio can be computer generated voice from text-to-speech software, or it can be a prerecorded or live audio recording from a real actor, or it can be real-time from a live actor at another remote location. Where there is audiovisual assistance, the audiovisual can be computer generated avatar, or other image, and have a voice generated from text-to-speech software, or it can be a prerecorded or live audiovisual recording from a real actor, or it can be real-time from a live actor at another remote location.

In some embodiments, the system can further comprise an output module 1155 operable for an output of data from the system, which can include an upload to a local drive, a network, the internet, or the cloud; a local video display or audio output, and the like. In some embodiments, the system can include a data exchange module 1160 operable for exchanging data from the system with data from another system including an online social network for users of the system. The display module 1125 can display video, for example, and can also be a part of the output module 1155. The data exchange module 1160 can be operable to exchange data with external computer readable media. All memory, such as the engines and modules, for example, are embodied in a non-transitory computer readable medium.

The systems and methods can include input/output devices (not shown) operable to receive and audio data or video data on a non-transitory computer readable medium, such as the data exchange module 1160. Examples of input devices are operable to interact with external data formats, voice-recognition software, a hand-held device in communication with the system including, but not limited to, a microphone, and the like, as well as a camera or other video image capture and transmission device. It should be appreciated that the input and output can be an analog or digital audio or video, The database 1130 is operable to store data on each user of the system for access on a non-transitory computer readable storage medium. Any digital data can be stored and accessed, including text files, as well as audio or video files known to one of skill in the art. As such, sound files, text files, image files, and the like can be processed. In some embodiments, the system can access any of a variety of accessible data through a data exchange module, as discussed above.

As such, the systems and methods can be configured for assembling an acting performance with a complementary series of events through a computer network. In these embodiments, the acting performance and the complementary series of events can each be created remote from the other, and the any complementary event or series of event can be one or more acting performances to assemble into an ensemble of performances.

The memory can include
an acting module 1115 embodied on a non-transitory computer readable medium and operable to receive acting performances as a data file of a remotely recorded performance and, a data file of a complementary series of events;
an assembly engine 1120 embodied on a non-transitory computer readable medium and operable for assembling the remotely recorded performance with the complementary series of events; wherein, the assembling includes
assigning a timing segment to a script to contain the remotely recorded performance and the complementary series of events, the timing segment configured with a timeline to align the location and duration of the data files in the timing segment for the assembling;
assigning a digital pace-setter to the timing segment, the digital pace-setter having a fixed position and fixed duration on the timeline, the fixed position configured to express a desired effect from the acting performances in the timing segment, and the fixed duration configured to contain the remotely recorded performance and the complementary series of events; wherein, the pace-setter is selected from the group consisting of a pace-setting performance, a pace-setting visual event, a pace-setting audio event, a pace-setting scripted time-frame, and a pace-setting subjective time frame; wherein, the start of the digital pace-setter is bounded on the timeline by a fixed start tag, the stop of the digital pace-setter is bounded by a fixed stop tag, and the duration of the pace-setter does not exceed the duration of the timing segment;
calibrating the digital pace-setter to the acting performances to align the acting performances for the assembly, the calibrating including
assigning a start pacing index on the digital pace setter that correlates with a start pacing index on the remotely recorded performance; assigning a stop pacing index on the digital pace setter that correlates with a stop pacing index on the remotely recorded performance within the timing segment;
assigning a start pacing index on the digital pace setter that correlates with a start pacing index on the complementary series of events; assigning a stop pacing index on the digital pace setter that correlates with a stop pacing index on the complementary series of events within the timing segment;
aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds tolerable limits, moving the stop pacing index on the remotely recorded performance to align with the position of the stop pacing index of the digital pace-setter;

aligning the complementary series of events with the digital pace-setter, the aligning including fixing the position of the start pacing index of the complementary series of events at the correlating start pacing index on the digital pace-setter, measuring the distance on the timeline between the position of the stop pacing index of the complementary series of events and the position of the correlating stop pacing index on the digital pace-setter and, when the distance exceeds tolerable limits, moving the stop pacing index on the complementary series of events to align with the position of the stop pacing index of the digital pace-setter;

a display module 1125 for displaying the remotely recorded acting performance with the complementary series of events after the assembling by the assembly engine;

and, a database 1130 embodied on a non-transitory computer readable medium and operable to store data for use by the systems and methods taught herein.

As noted herein, the complementary event, or complementary series of events, can be any series of events, each event having some digital form. An example of a complementary event can be any background that includes a second actor, a disaster, a location or change in location, a crowded room for a social gathering, and the like, each of which fits a digital profile that is labeled with an index. In some embodiments, the complementary series of events includes a second recorded performance.

The acting module can be configured to convert file formats to a desired file format for use by the assembly engine. In some embodiments, the acting module can be further operable to receive a script and/or display the script on a video display.

The methods provided herein include use of the technologies used in the systems. In some embodiments, a method of creating a remotely recorded performance for assembly with one or more other performances or complementary events is provided. In some embodiments, the method includes
  obtaining a system taught herein;
  obtaining a script having a timing segment including a performance to perform;
  recording the performance, the recording including
    identifying performance parameters including the start of the performance, the stop of the performance, and the duration of a pace-setter selected from the timing segment;
    performing the performance in a time that does not exceed the duration of the pace-setter; and,
    creating a data file of the remotely recorded performance to upload to the acting module.

In some embodiments, the script can be obtained in any standard format and be uploaded into the system. In some embodiments, the script can be scanned into the system as an image, for example a pdf format, and optical character recognition (OCR) can be used to store the script data. In some embodiments, the script can be available in the acting module or audition module, or be downloaded into the acting module or audition module.

In some embodiments, the recording can be done through the acting module 1115 or audition module and, in some embodiments, the recording can be done through the recording module 1140.

The methods can further include assessing the remotely recorded performance. The term "assessing" can be used to refer to assessing the quality of the performance, in some embodiments. However, in some embodiments, the term "assessing" can mean measuring how close the performance came to desired parameters that were established as a framework upon which to measure the performance. In some embodiments, the assessing can include
  uploading the remotely recorded performance to the acting module 1115;
  assembling the remotely recorded performance with the complementary series of events, wherein the assembling can be done through the assembly engine or, in some embodiments, the meshing engine;
  reviewing information from the assessment module for the timing segment including
    the distance measured on the timeline between the position of the stop pacing index of the remotely recorded performance and the position of the correlating stop pacing index on the digital pace-setter, the reviewing including determining whether the distance exceeded tolerable limits for acceptance of the performance or adjustment of the performance; and,
    the performance rating based on measurable acting parameters selected from the group consisting of timing, pace, voice volume, voice inflection, and consistency, the reviewing including determining whether the performance rating meets desired performance expectations.

The methods of assessing can include assembling a remotely recorded performance with a complementary series of events. In some embodiments, the methods include
  obtaining a system taught herein;
  obtaining a script;
  receiving acting performances as a data file of a remotely recorded performance and, a data file of a complementary series of events;
  assembling the remotely recorded performance with the complementary series of events; wherein, the assembling can be done through the assembly engine 1120 and includes
    assigning a timing segment from the script to contain the remotely recorded performance and the complementary series of events, the timing segment configured with a timeline to align the location and duration of the data files in the timing segment for the assembling;
    assigning a digital pace-setter to the timing segment, the digital pace-setter having a fixed position and fixed duration on the timeline, the fixed position configured to express a desired effect from the acting performances in the timing segment, and the fixed duration configured to contain the remotely recorded performance and the complementary series of events.

In some embodiments, the pace-setter can be selected from the group consisting of a pace-setting performance, a pace-setting visual event, a pace-setting audio event, a pace-setting scripted time-frame, and a pace-setting subjective time frame. And, in some embodiments, the start of the digital pace-setter can be bounded on the timeline by a fixed start tag (or index), the stop of the digital pace-setter can be bounded by a fixed stop tag (or index), and the duration of the pace-setter may not exceed the duration of the timing segment.

The methods of assessing can include calibrating the digital pace-setter to the acting performances to align the acting performances for the assembly. In some embodiments, the calibrating can include assigning the start pacing index on the digital pace setter that correlates with the start pacing index on the remotely recorded performance; assigning the stop pacing index on the digital pace setter that correlates with the stop pacing index on the remotely recorded performance within the timing segment;

assigning the start pacing index on the digital pace setter that correlates with the start pacing index on the remotely recorded performance; assigning the stop pacing index on the digital pace setter that correlates with the stop pacing index on the complementary series of events within the timing segment;

aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds tolerable limits, moving the stop pacing index on the remotely recorded performance to align with the position of the stop pacing index of the digital pace-setter;

aligning the complementary series of events with the digital pace-setter, the aligning including fixing the position of the start pacing index of the complementary series of events at the correlating start pacing index on the digital pace-setter, measuring the distance on the timeline between the position of the stop pacing index of the complementary series of events and the position of the correlating stop pacing index on the digital pace-setter and, when the distance exceeds tolerable limits, moving the stop pacing index on the complementary series of events to align with the position of the stop pacing index of the digital pace-setter;

and, displaying the remotely recorded acting performance with the complementary series of events after the assembling by the assembly engine.

In some embodiments, the complementary series of events includes a second recorded performance. And, in some embodiments, the obtaining of the script includes creating the script.

In some embodiments, the pace-setter for the timing segment is a pace-setting performance, where the pace-setting performance is a pre-recorded acting performance selected to achieve the desired effect for the timing segment. In some embodiments, the second recorded performance is assigned as the pace-setter.

It should be appreciated that the pace-setter is independently selected to set the pace for a portion of the script, a timing segment. In some embodiments, the script contains a series of timing segments, each timing segment in the series of timing segments having an independently selected pace-setter for the respective timing segment. And, in some embodiments, the pace-setter for each timing segment is independently selected to obtain an independently selected desired effect for the respective timing segment.

Moreover, it should be appreciated that the technologies provided herein include software. As such, a computer readable medium encoded with instructions for carrying out a process of assembling acting performances is provided, the acting performances including a remotely recorded performance. The process carried out by the software includes memory in the software configured and operable for sending instructions to a processor, instructing the processor in assembling a remotely recorded performance with a second recorded performance; wherein, the assembling includes assigning a timing segment from a script to contain the remotely recorded performance and the second recorded performance, the timing segment configured with a timeline to align the location and duration of the data files in the timing segment for the assembling;

assigning a digital pace-setter to the timing segment, the digital pace-setter having a fixed position and a fixed duration on the timeline, the fixed position configured to express a desired effect from the acting performances in the timing segment, and the fixed duration configured to contain the remotely recorded performance and the second recorded performance; wherein, the digital pace-setter is selected from the group consisting of a pace-setting performance, a pace-setting visual event, a pace-setting audio event, a pace-setting scripted time-frame, and a pace-setting subjective time frame; wherein, the start of the digital pace-setter is bounded on the timeline by a fixed start tag, the stop of the digital pace-setter is bounded by a fixed stop tag, and the duration of the pace-setter does not exceed the duration of the timing segment;

calibrating the digital pace-setter to the acting performances to align the acting performances for the assembly, the calibrating including assigning the start pacing index on the digital pace setter that correlates with the start pacing index on the remotely recorded performance; assigning the stop pacing index on the digital pace setter that correlates with the stop pacing index on the remotely recorded performance within the timing segment;

assigning the start pacing index on the digital pace setter that correlates with the start pacing index on the remotely recorded performance; assigning the stop pacing index on the digital pace setter that correlates with the stop pacing index on the second recorded performance within the timing segment;

aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds tolerable limits, moving the stop pacing index on the remotely recorded performance to align with the position of the stop pacing index of the digital pace-setter; and, aligning the second recorded performance with the digital pace-setter, the aligning including fixing the position of the start pacing index of the second recorded performance at the correlating start pacing index on the digital pace-setter, measuring the distance on the timeline between the position of the stop pacing index of the second recorded performance and the position of the correlating stop pacing index on the digital pace-setter and, when the distance exceeds tolerable limits, moving the stop pacing index on the second recorded performance to align with the position of the stop pacing index of the digital pace-setter;

and, displaying the remotely recorded acting performance with the second recorded performance after the assembling.

It should be appreciated that the systems provided can allow an actor to practice a particular section of a performance over and over. The systems can be configured having instructions for the process to repeat the particular section of the script for the actor to repeat until the actor feels it has achieved a desired performance expectation. In some embodiments, the instructions are configured into the audition module. In some embodiments, the instructions are configured into the acting module. And, in some embodiments, a separate module is configured for use by the systems as, perhaps, a "repeating module", "looping module", or the like. The function can be referred to as a "section repeat" in some embodiments, where a section can be any marked points in time between "repeat indices" that are placed by the system to mark the repeated sections. In some embodiments, the repeatable sections are a timing segment, a beat, a scene sequence, or the like. In some embodiments, the repeatable sections are defined by a pace-setter section placed into a timing segment, beat, or scene sequence. A skilled artisan will appreciate the value and flexibility of having the use of section repeats as repeatable sections to refine a performance. As such, there are also methods provided that, along with the other method steps taught herein, also include a step of selecting a repeatable section for a section repeat. There are also methods provided that, along with the other method steps taught herein, also include a step of repeating a section repeat, including embodiments that repeat the section repeat until the performance has reached a desired performance expectation. In some embodiments, the methods, along with the other method steps taught herein, also include selecting a section of a script for a section repeat, and repeating the section until the performance has reached a desired performance expectation. In some embodiments, the performance expectation can be defined as meeting any one or combination of performance criteria defined herein for use by the analysis module or assessment module.

Figure 14:
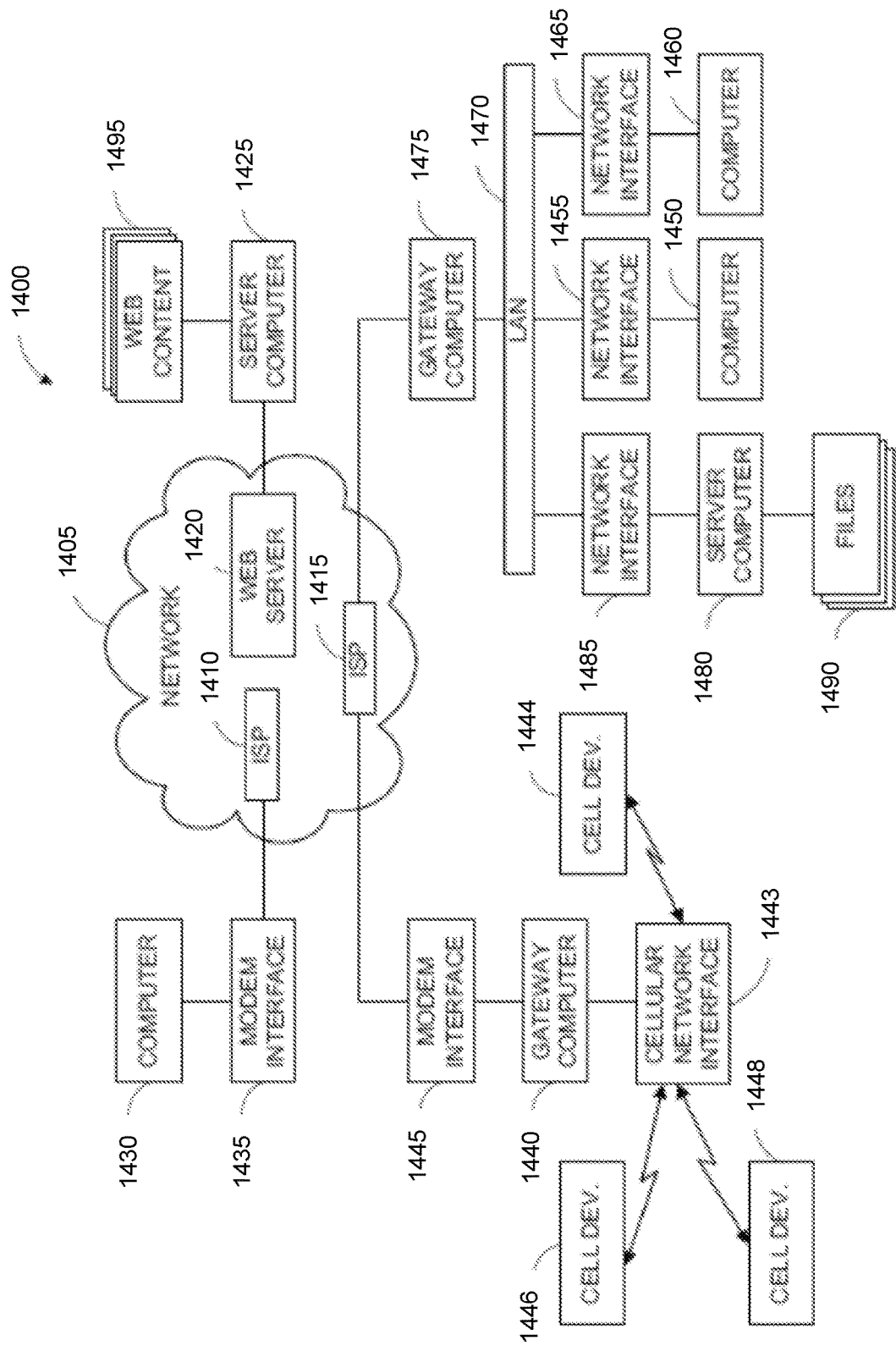
FIG. 14 shows how a network can be integrated with the systems and methods taught herein, according to some embodiments.

FIG. 14 shows how a network can be integrated with the systems and methods taught herein, according to some embodiments. In the extended system 1400, several computer systems are coupled together through a network 1405, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1405 is typically provided by internet service providers (ISP), such as the ISPs 1410 and 1415. Users on client systems, such as client computer systems 1430, 1450, and 1460 obtain access to the internet through the internet service providers, such as ISPs 1410 and 1415. Access to the internet allows users of the client computer systems to exchange information, receive and send e-mails, and view documents, such as documents which have been prepared in the HTML format. These documents are often provided by web servers, such as web server 1420 which is considered to be "on" the internet. Often these web servers are provided by the ISPs, such as ISP 1410, although a computer system can be set up and connected to the internet without that system also being an ISP.

The web server 1420 is typically at least one computer system which operates as a server computer system and is configured to operate with the protocols of the world wide web and is coupled to the internet. Optionally, the web server 1420 can be part of an ISP which provides access to the internet for client systems. The web server 1420 is shown coupled to the server computer system 1425 which itself is coupled to web content 1495, which can be considered a form of a media database. While two computer systems 1420 and 1425 are shown in FIG. 14, the web server system 1420 and the server computer system 1425 can be one computer system having different software components providing the web server functionality and the server functionality provided by the server computer system 1425 which will be described further below.

Cellular network interface 1443 provides an interface between a cellular network and corresponding cellular devices 1444, 1446 and 1448 on one side, and network 1405 on the other side. Thus cellular devices 1444, 1446 and 1448, which may be personal devices including cellular telephones or other similar devices, may connect with network 1405 and exchange information such as email, content, or HTTP-formatted data, for example. Cellular network interface 1443 is coupled to computer 1440, which communicates with network 1405 through modem interface 1445. Computer 1440 may be a personal computer, server computer or the like, and serves as a gateway. Thus, computer 1440 may be similar to client computers 1450 and 1460 or to gateway computer 1475, for example. Software or content may then be uploaded or downloaded through the connection provided by interface 1443, computer 1440 and modem 1445.

Client computer systems 1430, 1450, and 1460 can each, with the appropriate web browsing software, view HTML pages provided by the web server 1420. The ISP 1410 provides internet connectivity to the client computer system 1430 through the modem interface 1435 which can be considered part of the client computer system 1430. The client computer system can be a personal computer system, a network computer, a web TV system, or other such computer system.

Similarly, the ISP 1415 provides internet connectivity for client systems 1450 and 1460, although as shown in FIG. 14, the connections are not the same as for more directly connected computer systems. Client computer systems 1450 and 1460 are part of a LAN coupled through a gateway computer 1475. While FIG. 14 shows the interfaces 1435 and 1445 as generically as a "modem," each of these interfaces can be an analog modem, isdn modem, cable modem, satellite transmission interface (e.g. "direct PC"), or other interfaces for coupling a computer system to other computer systems.

Client computer systems 1450 and 1460 are coupled to a LAN 1470 through network interfaces 1455 and 1465, which can be ethernet network or other network interfaces. The LAN 1470 is also coupled to a gateway computer system 1475 which can provide firewall and other internet related services for the local area network. This gateway computer system 1475 is coupled to the ISP 1415 to provide internet connectivity to the client computer systems 1450 and 1460. The gateway computer system 1475 can be a conventional server computer system. Also, the web server system 1420 can be a conventional server computer system. Alternatively, a server computer system 1480 can be directly coupled to the LAN 1470 through a network interface 1485 to provide files 1490 and other services to the clients 1450, 1460, without the need to connect to the internet through the gateway system 1475.

Through the use of such a network, for example, the system can also provide an element of social networking, as well as a meeting platform for remote locations, whereby users can contact other users having similar subject-profiles and compete with one another qualitative and/or quantitatively, using subject scores or actual numerical scores. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device. In some embodiments, the systems and methods can operate from the server to a user, from the user to a server, from a user to a user, from a user to a plurality of users, in a mass user environment, from a user to a server to a user, from a server to a user (or plurality of users) and a screenwriter or director (or plurality thereof), or a server to a plurality of users and an administrator, for example. The administrators, directors, screenwriters, and the like, can be either real-time, simulated, or recorded, in some embodiments. The network can provide text and/or audio for real-time messaging, posting of messages, posting of instructional, posting of news or other items of a related interest to the users, and the like.

We claim:

1. A system for aligning and assembling an acting performance with a complementary series of events, the system comprising:
    a processor; and a memory that includes
        an acting module embodied on a non-transitory computer readable medium and operable to receive acting performances as a data file of a remotely recorded performance and, a data file of a complementary series of events;
        an assembly engine embodied on a non-transitory computer readable medium and operable for assembling the remotely recorded performance with the complementary series of events;
        wherein, the assembling includes
        assigning a timing segment to a script to contain the remotely recorded performance and the complementary series of events, the timing segment configured with a timeline to align a location and a duration of the data files in the timing segment for the assembling;
        assigning a digital pace-setter to the timing segment, the digital pace-setter having a fixed position and fixed duration on the timeline, the fixed position configured to express a desired effect from the acting performances in the timing segment, and the fixed duration configured to contain the remotely recorded performance and the complementary series of events;
        wherein, the pace-setter is selected from the group consisting of a pace-setting performance, a pace-setting visual event, a pace-setting audio event, a pace-setting scripted time-frame, and a pace-setting subjective time frame;
        wherein, a start of the digital pace-setter is bounded on the timeline by a fixed start tag, a stop of the digital pace-setter is bounded by a fixed stop tag, and a duration of the pace-setter does not exceed the duration of the timing segment;
    calibrating the digital pace-setter to the acting performances to align the acting performances for the assembly,
        the calibrating including
        assigning a start pacing index on the digital pace setter that correlates with a start pacing index on the remotely recorded performance; assigning a stop pacing index on the digital pace setter that correlates with a stop pacing index on the remotely recorded performance within the timing segment;
        assigning a start pacing index on the digital pace setter that correlates with a start pacing index on the complementary series of events; assigning a stop pacing index on the digital pace setter that correlates with a stop pacing index on the complementary series of events within the timing segment;
    aligning the remotely recorded performance with the digital pace-setter, the aligning including fixing the position of the start pacing index of the remotely recorded performance at the correlating start pacing index on the digital pace-setter, measuring a distance on the timeline between the position of the stop pacing index of the remotely recorded performance and the position of the correlating stop pacing index on the digital pace-setter and, when the distance exceeds a tolerable time limit, moving the stop pacing index on the remotely recorded performance to align with the position of the stop pacing index of the digital pace-setter;
    aligning the complementary series of events with the digital pace-setter, the aligning including fixing the position of the start pacing index of the complementary series of events at the correlating start pacing index on the digital pace-setter, measuring a distance on the timeline between the position of the stop pacing index of the complementary series of events and the position of the correlating stop pacing index on the digital pace-setter and, when the distance exceeds a tolerable time limit, moving the stop pacing index on the complementary series of events to align with the position of the stop pacing index of the digital pace-setter;
    a display module for displaying the remotely recorded acting performance with the complementary series of events after the assembling by the assembly engine; and
    a database embodied on a non-transitory computer readable medium and operable to store data.

2. The system of claim 1, wherein the complementary series of events includes a second recorded performance.

3. The system of claim 2, wherein the acting module is configured to convert file formats to a desired file format for use by the assembly engine.

4. The system of claim 1, wherein the acting module is further operable to receive the script, display the script, or receive and display the script on a video display.

5. The system of claim 1, wherein the system further comprises an assessment module on a non-transitory computer readable medium and operable to receive alignment information from the assembly engine to provide an assessment of the remotely recorded performance.

6. The system of claim 1, wherein the system further comprises an assessment module on a non-transitory computer readable medium and operable to measure voice inflection to provide an assessment of the remotely recorded performance.

7. The system of claim 1, wherein the system further comprises an assessment module on a non-transitory computer readable medium operable for calculating a performance rating based on measurable acting parameter selected from the group consisting of timing, pace, voice volume, voice inflection, and consistency.

8. The system of claim 1, wherein the system further comprises an assessment module on a non-transitory computer readable medium operable for providing a real-time streaming of the acting performance for a real-time review by a casting director.

9. The system of claim 1, wherein the system further comprises a recording module on a non-transitory computer readable medium and operable to record the remotely recorded performance.

10. The system of claim 1, wherein the system further comprises an enhancement module on a non-transitory computer readable medium operable for enhancing audio or video data in the remotely recorded performance to create a desired effect from a performance.

11. The system of claim 1, wherein the system further comprises a reading module on a non-transitory computer readable medium operable for providing a computer reading of an accompanying part in the script to assist in the creation of the remotely recorded performance.

12. A method of creating a remotely recorded performance to assemble with the system of claim 1, the method comprising:
  obtaining the system of claim 1;
  obtaining the script having the timing segment including a performance to perform;
  recording the performance, the recording including
    identifying the performance parameters including the start of the performance, the stop of the performance, and the duration of the pace-setter;
    performing the performance in a time that does not exceed the duration of the pace-setter; and
    creating a data file of the remotely recorded performance to upload to the acting module.

13. The method of claim 12, further comprising:
  assessing the remotely recorded performance, the assessing including:
  uploading the remotely recorded performance to the acting module;
  assembling the remotely recorded performance with the complementary series of events;
  reviewing information from the assessment module for the timing segment including the distance measured on the timeline between the position of the stop pacing index of the remotely recorded performance and the position of the correlating stop pacing index on the digital pace-setter, the reviewing including determining whether the distance exceeded the tolerable time limit; and
  the performance rating based on measurable acting parameters selected from the group consisting of: timing, pace, voice volume, voice inflection, and consistency, the reviewing including determining whether the performance rating meets desired performance expectations.

14. The method of claim 13, wherein: the second recorded performance is assigned as the pace-setter.

15. The method of claim 12, wherein the complementary series of events includes a second recorded performance.

16. The method of claim 12, wherein the obtaining of the script includes creating the script.

17. The method of claim 12, wherein: the pace-setter for the timing segment is a pace-setting performance, where the pace-setting performance is a pre-recorded acting performance is selected to achieve the desired effect for the timing segment.

18. The method of claim 12, further comprising:
  a series of timing segments, each timing segment in the series of timing segments having an independently selected pace-setter for the respective timing segment;
  wherein, the pace-setter for each timing segment is independently selected to obtain an independently selected desired effect for the respective timing segment.

19. A method of assembling a remotely recorded performance with a complementary series of events, the method comprising:
  obtaining the system of claim 1;
  obtaining the script;
  receiving acting performances as a data file of a remotely recorded performance and, a data file of a complementary series of events;
  assembling the remotely recorded performance with the complementary series of events;
  wherein, the assembling includes
    assigning the timing segment from the script to contain the remotely recorded performance and the complementary series of events, the timing segment configured with a timeline to align the location and duration of the data files in the timing segment for the assembling;
    assigning a digital pace-setter to the timing segment, the digital pace-setter having a fixed position and fixed duration on the timeline, the fixed position configured to express a desired effect from the acting performances in the timing segment, and the fixed duration configured to contain the remotely recorded performance and the complementary series of events;
    wherein, the pace-setter is selected from the group consisting of a pace-setting performance, a pace-setting visual event, a pace-setting audio event, a pace-setting scripted time-frame, and a pace-setting subjective time frame;
    wherein, the start of the digital pace-setter is bounded on the timeline by a fixed start tag, the stop of the digital pace-setter is bounded by a fixed stop tag, and the duration of the pace-setter does not exceed the duration of the timing segment;
  calibrating the digital pace-setter to the acting performances to align the acting performances for the assembly,
    the calibrating including
      assigning the start pacing index on the digital pace setter that correlates with the start pacing index on the remotely recorded performance;
      assigning the stop pacing index on the digital pace setter that correlates with the stop pacing index on the remotely recorded performance within the timing segment;

assigning the start pacing index on the digital pace setter that correlates with the start pacing index on the complementary series of events;

assigning the stop pacing index on the digital pace setter that correlates with the stop pacing index on the complementary series of events within the timing segment;

aligning the remotely recorded performance with the digital pace-setter, the aligning including fixing the position of the start pacing index of the remotely recorded performance at the correlating start pacing index on the digital pace-setter, measuring the distance on the timeline between the position of the stop pacing index of the remotely recorded performance and the position of the correlating stop pacing index on the digital pace-setter and, when the distance exceeds a tolerable time limit, moving the stop pacing index on the remotely recorded performance to align with the position of the stop pacing index of the digital pace-setter;

aligning the complementary series of events with the digital pace-setter, the aligning including fixing the position of the start pacing index of the complementary series of events at the correlating start pacing index on the digital pace-setter, measuring the distance on the timeline between the position of the stop pacing index of the complementary series of events and the position of the correlating stop pacing index on the digital pace-setter and, when the distance exceeds a tolerable time limit, moving the stop pacing index on the complementary series of events to align with the position of the stop pacing index of the digital pace-setter; and displaying the remotely recorded acting performance with the complementary series of events after the assembling by the assembly engine.

20. A non-transitory computer readable medium encoded with instructions for carrying out a process of assembling acting performances that include a remotely recorded performance, the process comprising:

assembling a remotely recorded performance with a second recorded performance;

wherein, the assembling includes assigning a timing segment from a script to contain the remotely recorded performance and the second recorded performance, the timing segment configured with a timeline to align a location and a duration of the data files in the timing segment for the assembling;

assigning a digital pace-setter to the timing segment, the digital pace-setter having a fixed position and a fixed duration on the timeline, the fixed position configured to express a desired effect from the acting performances in the timing segment, and the fixed duration configured to contain the remotely recorded performance and the second recorded performance;

wherein, the digital pace-setter is selected from the group consisting of a pace-setting performance, a pace-setting visual event, a pace-setting audio event, a pace-setting scripted time-frame, and a pace-setting subjective time frame;

wherein, a start of the digital pace-setter is bounded on the timeline by a fixed start tag, a stop of the digital pace-setter is bounded by a fixed stop tag, and a duration of the pace-setter does not exceed the duration of the timing segment;

calibrating the digital pace-setter to the acting performances to align the acting performances for the assembly, the calibrating including assigning a start pacing index on the digital pace setter that correlates with a start pacing index on the remotely recorded performance;

assigning a stop pacing index on the digital pace setter that correlates with a stop pacing index on the remotely recorded performance within the timing segment;

assigning a start pacing index on the digital pace setter that correlates with a start pacing index on the second recorded performance;

assigning a stop pacing index on the digital pace setter that correlates with a stop pacing index on the second recorded performance within the timing segment;

aligning the remotely recorded performance with the digital pace-setter, the aligning including fixing the position of the start pacing index of the remotely recorded performance at the correlating start pacing index on the digital pace-setter, measuring a distance on the timeline between the position of the stop pacing index of the remotely recorded performance and the position of the correlating stop pacing index on the digital pace-setter and, when the distance exceeds a tolerable time limit, moving the stop pacing index on the remotely recorded performance to align with the position of the stop pacing index of the digital pace-setter; and aligning the second recorded performance with the digital pace-setter, the aligning including fixing the position of the start pacing index of the second recorded performance at the correlating start pacing index on the digital pace-setter, measuring a distance on the timeline between the position of the stop pacing index of the second recorded performance and the position of the correlating stop pacing index on the digital pace-setter and, when the distance exceeds a tolerable time limit, moving the stop pacing index on the second recorded performance to align with the position of the stop pacing index of the digital pace-setter; and displaying the remotely recorded acting performance with the second recorded performance after the assembling.

* * * * *